(12) United States Patent
Moore

(10) Patent No.: US 8,167,234 B1
(45) Date of Patent: May 1, 2012

(54) INSECT-LIKE MICRO AIR VEHICLE HAVING PERCHING, ENERGY SCAVENGING, CRAWLING, AND OFFENSIVE PAYLOAD CAPABILITIES

(76) Inventor: Michael Moore, Alplaus, NY (US)

(*) Notice: Subject to any disclaimer, the term of this patent is extended or adjusted under 35 U.S.C. 154(b) by 215 days.

(21) Appl. No.: 12/728,271

(22) Filed: Mar. 21, 2010

(51) Int. Cl.
*B64C 27/52* (2006.01)

(52) U.S. Cl. .................. 244/17.25; 244/17.23

(58) Field of Classification Search ........... 244/1 R, 244/17.23, 17.25, 17.27, 22, 11
See application file for complete search history.

(56) References Cited

U.S. PATENT DOCUMENTS

| | | | |
|---|---|---|---|
| 3,321,022 A * | 5/1967 | Oguri ............................ 244/7 R |
| 3,405,890 A * | 10/1968 | Eickmann .................. 244/17.23 |
| 6,082,671 A * | 7/2000 | Michelson ...................... 244/72 |
| 6,206,324 B1 | 3/2001 | Smith |
| 6,446,909 B1 | 9/2002 | Michelson |
| 6,565,039 B2 | 5/2003 | Smith |
| 6,766,638 B1 | 7/2004 | Tilston et al. |
| 6,783,097 B1 | 8/2004 | Smith |
| 6,938,853 B2 | 9/2005 | Pines et al. |
| 6,959,895 B2 | 11/2005 | Cylinder |
| 7,204,455 B2 * | 4/2007 | Sinclair .......................... 244/72 |
| 7,252,265 B2 | 8/2007 | Perlo et al. |
| 7,318,564 B1 * | 1/2008 | Marshall ....................... 244/1 R |
| 7,331,546 B2 | 2/2008 | Ifju et al. |
| 7,398,946 B1 * | 7/2008 | Marshall ....................... 244/1 R |
| 7,487,937 B2 | 2/2009 | Ifju et al. |
| 7,651,051 B2 | 1/2010 | Agrawal et al. |
| 7,658,346 B2 * | 2/2010 | Goossen .................... 244/17.23 |
| 7,658,347 B2 | 2/2010 | Goossen et al. |
| 7,665,688 B2 | 2/2010 | Cylinder et al. |
| 2004/0195436 A1 * | 10/2004 | Sinclair .......................... 244/49 |
| 2007/0181742 A1 * | 8/2007 | Van de Rostyne et al. 244/17.23 |
| 2007/0205322 A1 * | 9/2007 | Liao ............................... 244/22 |
| 2007/0210207 A1 * | 9/2007 | Liao ............................... 244/22 |
| 2009/0194634 A1 * | 8/2009 | Stelte ........................... 244/1 R |
| 2010/0193626 A1 * | 8/2010 | Goossen et al. ................. 244/2 |

* cited by examiner

*Primary Examiner* — Timothy D Collins
*Assistant Examiner* — Steven Hawk

(57) ABSTRACT

A micro air vehicle (MAV) comprises features that emulate insect-like topology and flight, including a dangling three part body (100a, 100b, 100c), wing-like dual side rotors (107, 107a) positioned to either side on rotor arms (103) providing tilt and teeter motions to vector thrust and allow crawling along improved surfaces, and elevators (101) that approximate the center of gravity and center of pressure control employed by insects via the inertial reaction and aerodynamic influence of a repositionable abdomen. Control, sensing, surveillance, and payload elements (114), (401), (402), (403), (404), (405), and (407) enable transmission of surveillance and engagement of an emerging target. Left and right perch hangers and grapples (112, 112a) allow perching on various structures, and energy storage (504) and (505) combined with power line (500) and solar (502) energy scavenging circuitry allow extended loiter and mission duration by replenishing onboard energy supplies.

6 Claims, 20 Drawing Sheets

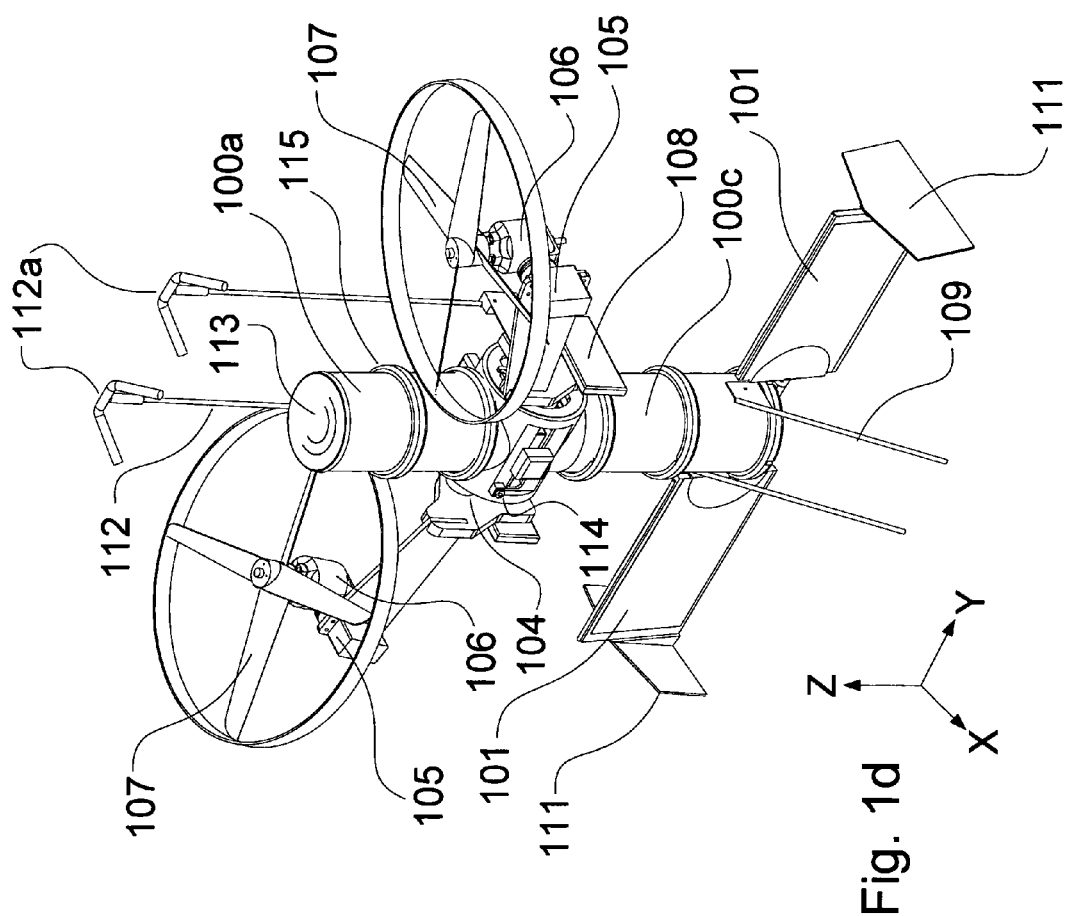

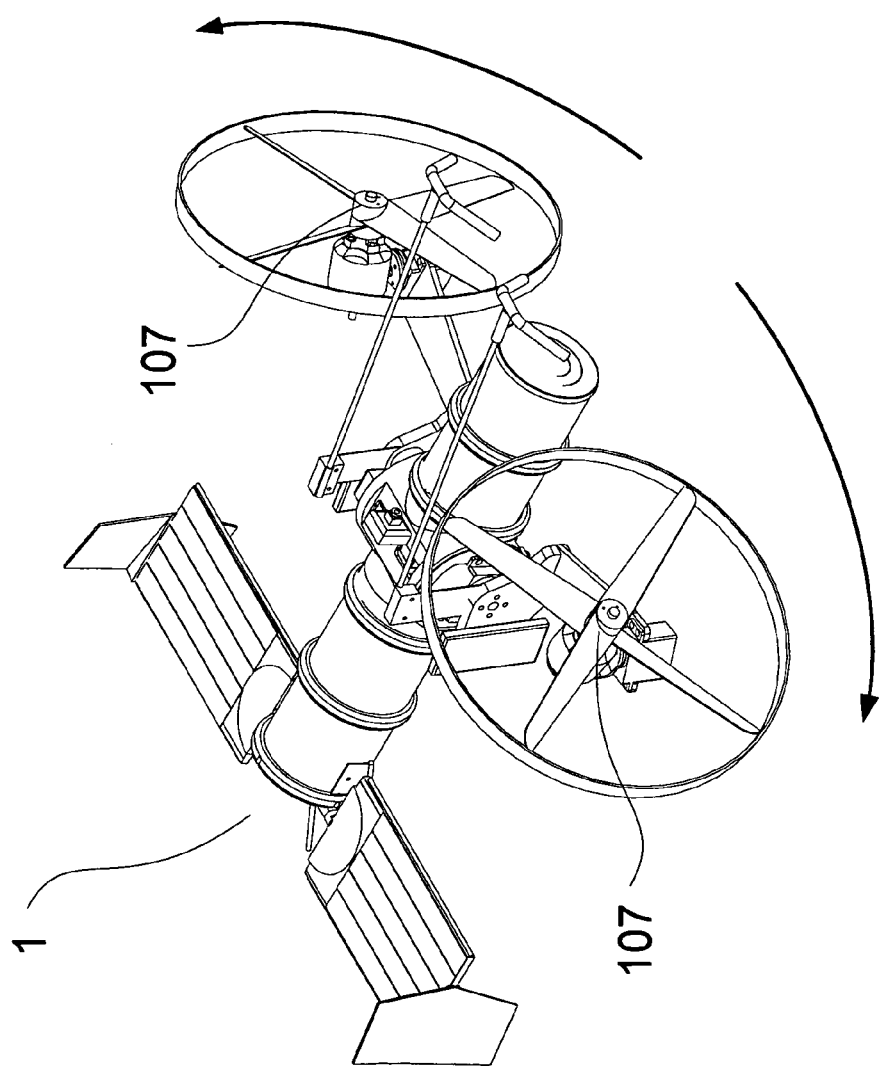

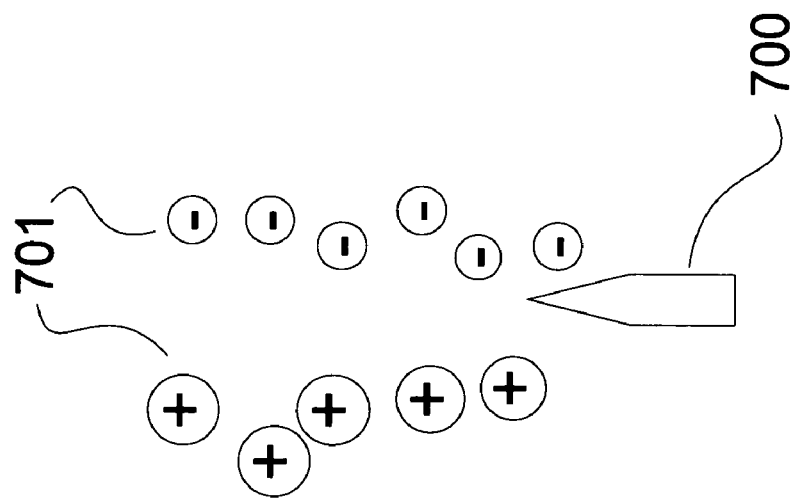

Figure 1A:
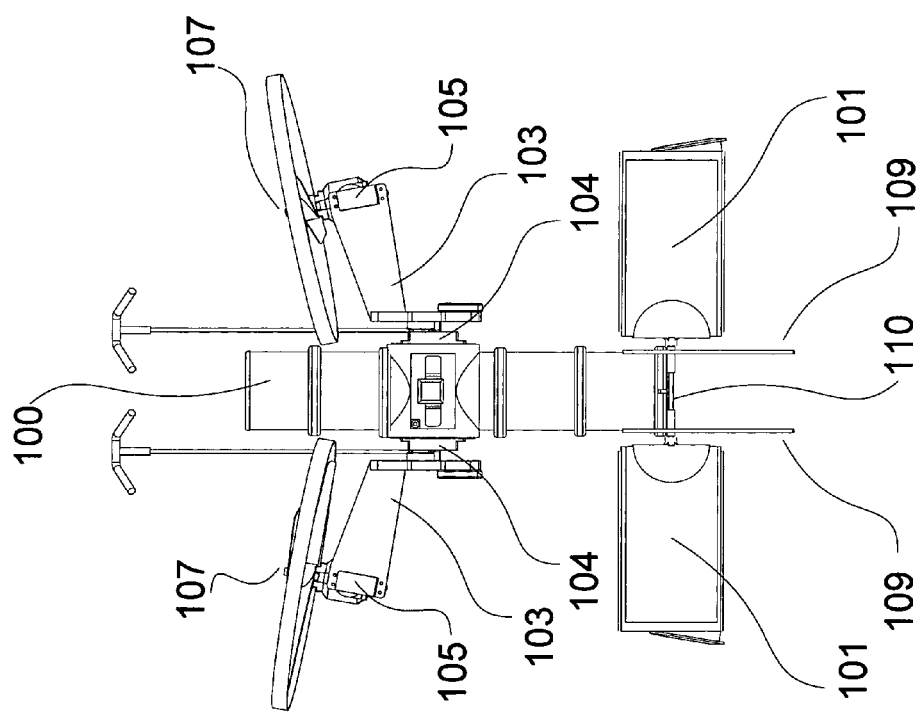

INSECT-LIKE MICRO AIR VEHICLE HAVING PERCHING, ENERGY SCAVENGING, CRAWLING, AND OFFENSIVE PAYLOAD CAPABILITIES

FEDERALLY SPONSORED RESEARCH

This work was funded under contract FA8651-09-M-0171, AFRL/RWK, Department of the Air Force, 101 West Eglin Blvd., Suite 337, Eglin AFB, μL 32542.

The U.S. Government is granted a nonexclusive, nontransferable, irrevocable, paid-up license to practice or have practiced for or on behalf of the United States the subject invention herein throughout the world.

CROSS-REFERENCE TO RELATED APPLICATIONS

Not Applicable

SEQUENCE LISTING OR PROGRAM

Not Applicable

BACKGROUND

1. Field of Invention

This invention relates to surveillance MAVs (micro air vehicles), specifically to those MAVs employing an insect-like topology to give the ability to fly very precisely and with great maneuverability and to perch, giving ability to scavenge energy from various sources, giving the ability to crawl terrestrially, and giving capability to deploy an offensive payload and return to point of origin.

2. Prior Art

Micro air vehicles (MAVs) are very useful tools for surveillance, incursion, and offensive payload deployment into areas where danger exists to personnel.

Current MAVs have a limited loiter time due to using circling or regularized flight at altitude to accomplish loiter. Previous approaches to extend MAV loiter have typically exploited very small, efficient fixed wing airframes that attempt to minimize the energy required to remain aloft. Because of this, the aircraft comprise a basic fixed wing plan form (wing, fuselage, rudder; wing, fuselage, rudder, stabilizer) and must remain at a range of at least loiter altitude from the target (hundreds to thousands of feet) while transmitting video and other surveillance back to the operator.

Disadvantages of these approaches are numerous and varied. First, accomplishing loiter by remaining aloft requires energy that could be used for some other purpose and constantly advertises the presence of the MAV to onlookers. Second, the shape of the common fixed wing aircraft plan form is easily recognizable, and because of this the MAVs purpose is easily surmised once spotted. Third, while increased loiter altitude lessens the delectability of the MAV it also decreases the quality of surveillance possible. Finally, because of the considerable wing span of most MAVs (when compared to fuselage length and other dimensions) and the significant forward velocity to remain aloft, motion into areas containing obstacles closer than together than several wing spans apart to get a closer view of the target is very problematic.

A MAV with a very compact, very maneuverable, and relatively unfamiliar plan form or topology that may perch on various objects would allow both the efficient translational flight and delicate maneuver required for perching and loitering, and eliminate the energy expenditure required to remain on station, while being able to conceal its presence while perched.

Current MAVs are very limited in the ability to perch and replenish of on board energy supplies, and thus have to return to their point of origin to extend mission duration, in the process losing contact with the target and doubling the exposure to unwanted observation. Prior attempts at MAV perching leverage the extreme thrust to weight ratio currently available to model aircraft fixed wing plan forms and require a 'pitch up' type of maneuver to transition the MAV from forward flight to a propeller based hover, finishing with the aircraft fuselage vertically oriented. Several modifications (including one very mathematical development) of the general fixed wing plan form have been attempted, including control of the stabilizer in similar fashion to a bird's tail during landing, but still require the transition of an aircraft from straight and level flight at high speed to hover with vertically oriented fuselage. The pitch up maneuver required to transition from efficient, high speed forward flight to hover for perching requires time and distance to accomplish, and thus runs increased risk of observation. Other perching attempts simply impact a power line or tree limb with a clamping mechanism which closes upon contact, with the aircraft momentum being dissipated in displacement of the wire or limb and in rotation of the aircraft about the wire or limb until forward kinetic energy is dissipated!

A MAV that may easily perch on a structure, without complex or risky maneuver, and remain motionless while gathering surveillance, without the immediately recognizable characteristics of fixed wing plan forms would greatly extend MAV missions as well as be much less detectable while perched.

Previous approaches to energy scavenging or energy harvesting have used lightweight, high power solar cells on the horizontal surfaces of the plan form (mainly wings and horizontal stabilizer) or a clamp around current transformer to inductively gather energy from an overhead wire.

While readily usable, solar power is relatively incapable of quick mission turnaround for recharging of propulsion batteries. Inductive scavenging of power lines has greater possibility for fairly rapid energy capture, but is relatively inefficient, bulky, heavy, and requires an almost prohibitively complex mechanism for clamping the current transformer onto the elevated wire and releasing it against a strong magnetic field (the current transformer must open wide and then close to an internal diameter very close to that of the wire being clamped for maximum energy transfer, all while in motion), making accurate perching problematic in unsettled or windy conditions or at even moderate forward velocities. Additionally, since magnetic field scavenging is completely dependent upon the current in the wire at any given time, an energized but unloaded distribution wire is useless as an energy source.

A MAV that may scavenge energy quickly and easily, with little maneuver or mechanical encumbrance and not dependent on the load attached to the power line circuit, would be able to deploy and loiter on station for exceptionally extended periods of time.

Current MAVs are virtually unable to crawl along the ground or relatively improved surface because of wingspan, bulkiness, unsuited propulsion, and turning difficulties. Previous approaches to MAV crawling are also very basic, including simple powered taxi on fixed, existing landing gear and complex folding wings to facilitate terrestrial maneuver in tight places.

The disadvantages of the prior approaches are the inability to overcome obstacles much larger than wheel diameter or landing gear length, the use of noisy and inefficient propeller thrust for terrestrial motion and subsequent waste of MAV energy, poor rough surface taxi characteristics of tricycle landing gear topologies, interferences with obstacles due to wing span, and the weight and complexity penalty incurred by employing wing folding mechanisms. All lessen MAV range, endurance, and payload carriage.

A MAV that could travel and navigate terrestrially without undue restriction would have the advantage of approaching targets or objectives to close proximity while the MAV was on the ground.

Finally, current MAVs are usually unarmed, or if armed cannot deploy an offensive payload without self destructing. Previous approaches to arming MAVs have been simply the carriage of explosive or ordinance that upon use resulted in the total loss of the MAV and with it the ability to ascertain damage to the engaged target. In addition to the immediate loss of surveillance capability, scattered MAV remnants may be used to identify its country of origin, its perch position, or ultimately the position of the operator.

A MAV that could carry a significant offensive payload, expel it, and return to the operator would be reusable and would lessen the possibility of exposure of the operator, the MAV country of origin, and the mission to the target or objective, while providing the ability to ascertain effect of payload deployment on the target.

U.S. Pat. No. 7,665,688 (Cylinder et al, 2010) claims a complex MAV that has multiple motors, flight surfaces, and flight modes. The MAV consists of a horizontal fuselage supporting a tilting, forward canard that in turn supports two motors and propellers, a center counter rotating pair of airfoil wings, and a nearly conventional rudder and fin layout at the rear of the fuselage. Because of this layout, the MAV may hover with the canard propellers tilted to vector thrust downward and a center motor spinning the center counter rotating airfoils, may perform forward flight in this configuration, and may lock the center counter rotating airfoils in place, rotate the canard supported propellers to horizontal, and fly akin to a conventional canard based, fixed wing design.

U.S. Pat. No. 7,665,688 differs considerably from the MAV contemplated herein. First, for necessity of balance its fuselage must remain horizontal or nearly so. Second, because of the weight and thrust layout, the rear tail surfaces begin to hint at the common fixed wing plan form and thus are recognizable. Third, the anti torque counter rotating mechanism employed swings two individual, complete airfoils (of large combined span) in opposite directions, with little evidence of counterbalance, flapping, advance or other mitigating techniques commonly used in full scale rotorcraft to combat thrust asymmetries. Fourth, crawling appears to be only possible with center counter rotating airfoils rotated longitudinally and the vehicle being pulled by front propeller thrust. Finally, it has no ability to perch on wires or tree limbs and dictate its direction of orientation while perched, no apparent scavenging capacity or apparatus, and no deployable payload is mentioned.

U.S. Pat. No. 7,658,346 (Goossen, 2010) claims a double ducted fan without central fuselage that uses moveable tail cones and speed brakes to effect control in pitch, roll, and yaw. The MAV in U.S. Pat. No. 7,658,346 is designed to carry payload as selected by soldiers, and mentions surveillance as an accompanying purpose. This disclosure also mentions the difficulties of center of gravity control for the side by side, double ducted design, a problem solved by the insect-like topology contemplated herein. Additionally, the MAV claimed in U.S. Pat. No. 7,658,346 cannot crawl, cannot perch on a wire, has no scavenging capability, and is depicted solely power by internal combustion motors, the carriage of fuel for which is not favored by US military operations.

U.S. Pat. No. 7,398,946 (Marshall, 2008) claims a fixed wing MAV carrying a magnetic induction, clamp on apparatus for 'parking' on a power line and extracting energy from the magnetic field surrounding the conductor. Much of the detail of the aerodynamic function of the MAV is left unexplained and unclaimed, with simultaneous propulsion and lift sources embedded in lifting wings, depicted in drawings but not sufficiently described. The MAV claimed in this patent includes surveillance sensors and transmitters of various types, includes carriage of an 'weapon' payload, and even claims a method of military of release, parking on a power line for energy replenishment, surveillance during the period of parking, and possible return to point of origin or redeployment and relocation.

The MAV claimed in U.S. Pat. No. 7,398,946 differs from the MAV contemplated herein in several significant areas. First, the MAV is depicted as having an easily recognized, fixed wing layout. Second, its method of energy scavenging from power lines is magnetic, meaning that it carries a complex, heavy, and bulky champing mechanism to concentrate the magnetic field around the power line. Most importantly, though, this type of energy scavenging is completely dependent on the amount of current flowing through the power line and cannot take advantage of the elevated electrical potential of the power line (indeed the elevated potential creates difficulties for the claimed MAV, as admitted by Marshall). If the current in the power line is small (as it will be designed to be, since as power line voltage potentials increase, current decreases to conserve $I^2R$ losses), induction energy available will decrease to possibly negligible levels. Also, this inductive clamp on approach cannot gather energy from high voltage DC transmission systems, present in the Middle East and elsewhere.

To accomplish perching, the MAV does not hover but simply flies at moderate speed forward until impact closes the clamping system. Provision is made for Hall effect sensing of the field around the 'parking' wire, but such sensing is extremely short range and of dubious utility for approach to the power line at distances greater than several inches. Additionally, it is assumed that once clamped the MAV may spin about the 'parking' wire until its forward kinetic energy is dissipated. No capacity for hover or very slow flight is claimed, and no capacity for electric field scavenging is claimed. No capacity for leveraging corona effects or a coronal virtual ground is claimed. U.S. Pat. No. 7,398,946 claims minor ability to orient the MAV while perched, but apparently in only two orthogonal directions, and in conjunction with 'parking' while flying parallel to the power line (again at appreciable forward velocity, claimed 35 MPH). The MAV claimed cannot crawl unless it lands and taxis on depicted landing gear, and the part of the military mission that would include landing on terra firma and crawling to get a close view of an objective, or crawling to engage personnel, vehicles, or structures on the ground, is not claimed or even mentioned.

U.S. Pat. No. 7,318,564 (Marshall, 2005) is authored by the same applicant as U.S. Pat. No. 7,398,946, contains virtually identical technology, and thus also differs from the MAV contemplated herein as previously described.

Various winged and flapping disclosures, specialty airfoils, launching pads, flying attachments to cell phones, wing combinations, wing articulations, hydrogen peroxide propulsion systems, chemical muscles, flapping entomopters (U.S. Pat. Nos. 7,651,051; 7,487,937; 7,658,347; 7,331,546; 7,252,265;

6,959,895; 6,938,853; 6,783,097; 6,766,638; 6,565,039; 6,446,909; 6,206,324 and 6,082,671) all claim aspects of insect flight that have utility, but none save U.S. Pat. No. 6,082,671 claim an entire MAV vehicle, and the remainder claim aspects unused in the MAV contemplated herein.

Additionally, various man sized dual ducted fan jet packs, such as the Martin Jet Pack, and multi rotor MAVs such as the DraganFly series have aspects of the MAV contemplated herein, but do not combine the insect-like flight features with the versatilities of perching, scavenging, crawling, and payload expulsion.

Spark gap based energy harvesting for scavenging is known in the literature and typically involves a direct connection to earth ground to function and keep involved circuitry from floating to unacceptably high potentials. In no cases, though, does the deliberate initiation of corona losses (which can be greater than tens of watts per meter of conductor) substitute for and function as the earth ground to sustain a high frequency relaxation oscillation for weight and size reductions beneficial for use with scavenging MAVs.

In short, the prior art does not contain a micro air vehicle with the requisite features to achieve insect like flight and thus achieve extreme mission versatility. All prior approaches are deficient in at least one of the following required features:

a. an insect-like topology to simultaneously provide very precise hover, efficient slow and fast flight, extreme maneuverability, small physical dimensions, ease of perching, and give appearance deception and camouflage capabilities;

b. highly integrated, simultaneous scavenging capability from solar, medium and high potential electric fields, and wind currents;

c. highly integrated ability to land and crawl terrestrially for surveillance advantage;

d. the ability to discharge an offensive payload in flying, perched, or crawling configurations to enable reuse and limit exposure of the presence and origin of operator and vehicle to discovery.

SUMMARY

In accordance with one embodiment, an 'insect-like' micro air vehicle (MAV) that overcomes the difficulties of fight, perching, energy scavenging, and crawling associated with prior approaches to allow a greatly extended mission duration, versatility, and capability. The invention's flight mimics the aerodynamics of insects which fly with their abdomens at a relatively large angle with respect to their translational motion (an example being the common mayfly, *Hexagenia limbata*), and these insect-like characteristics in turn confer excellent capabilities for perching, energy scavenging, and crawling due to the MAV plan form and topology, enabling a very high degree of versatility and functional integration.

DRAWINGS

Figures

Figure 1B:
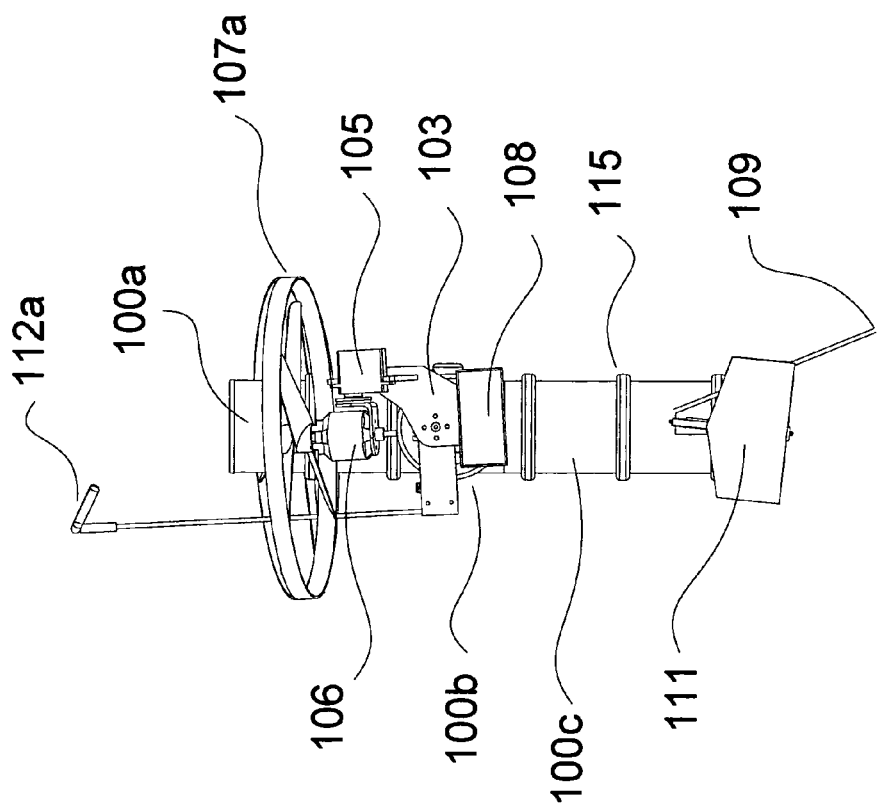
Figure 1C:
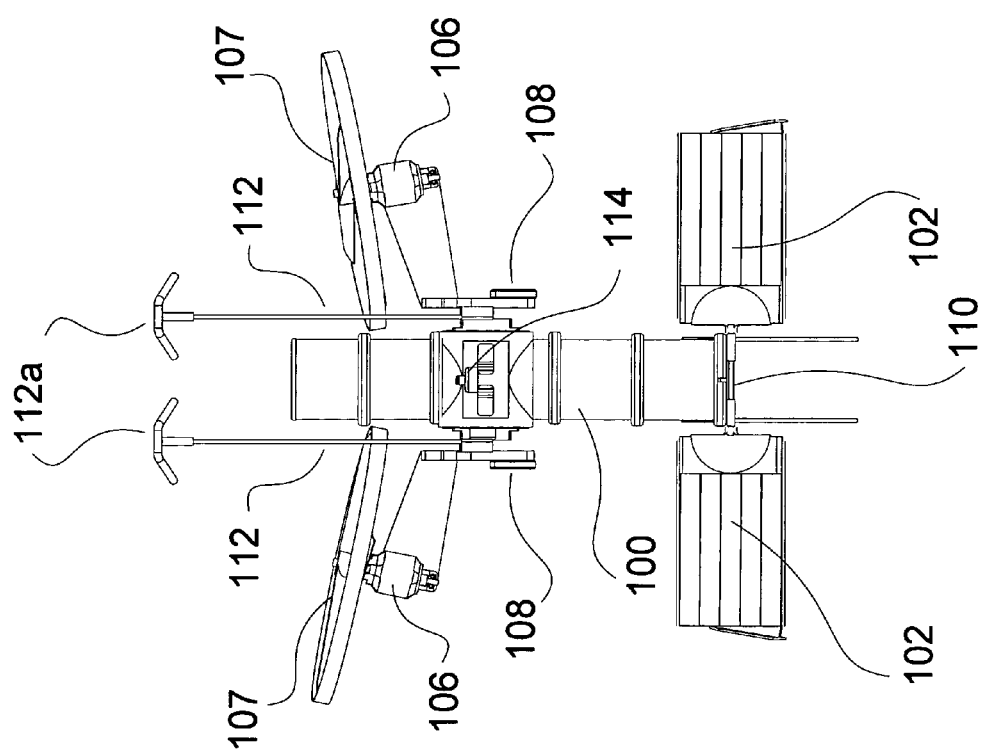
Figure 2A:
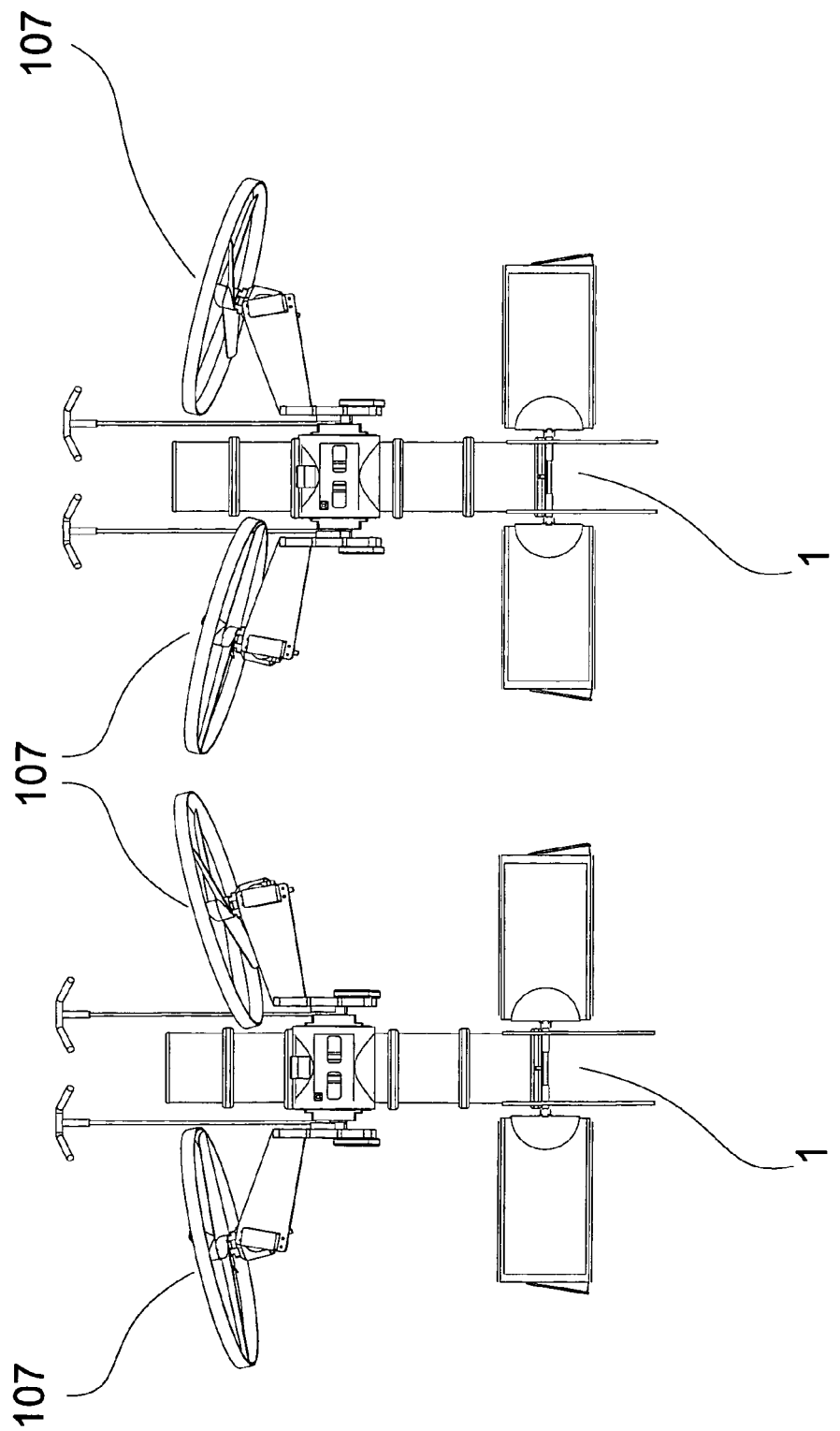
Figure 2B:
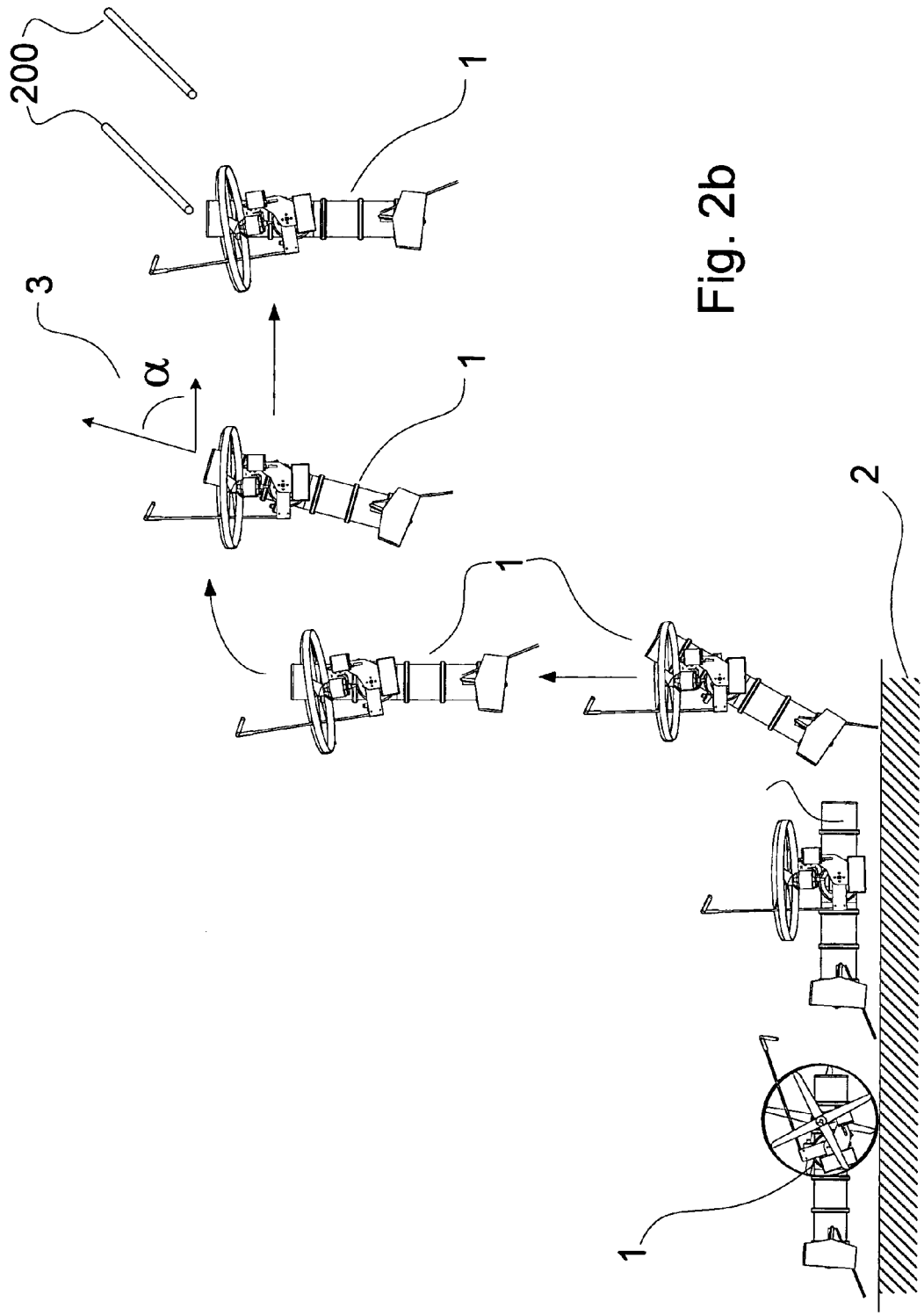
Figure 2C:
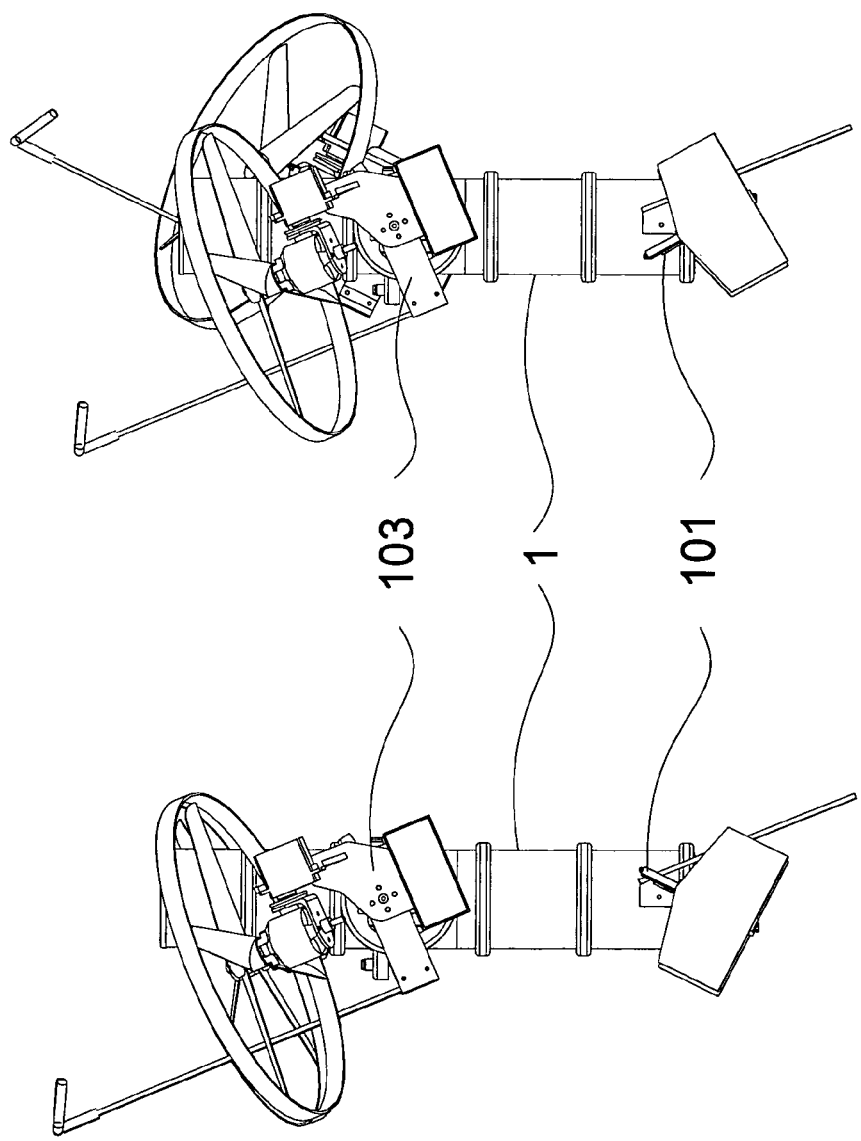
Figure 3A:
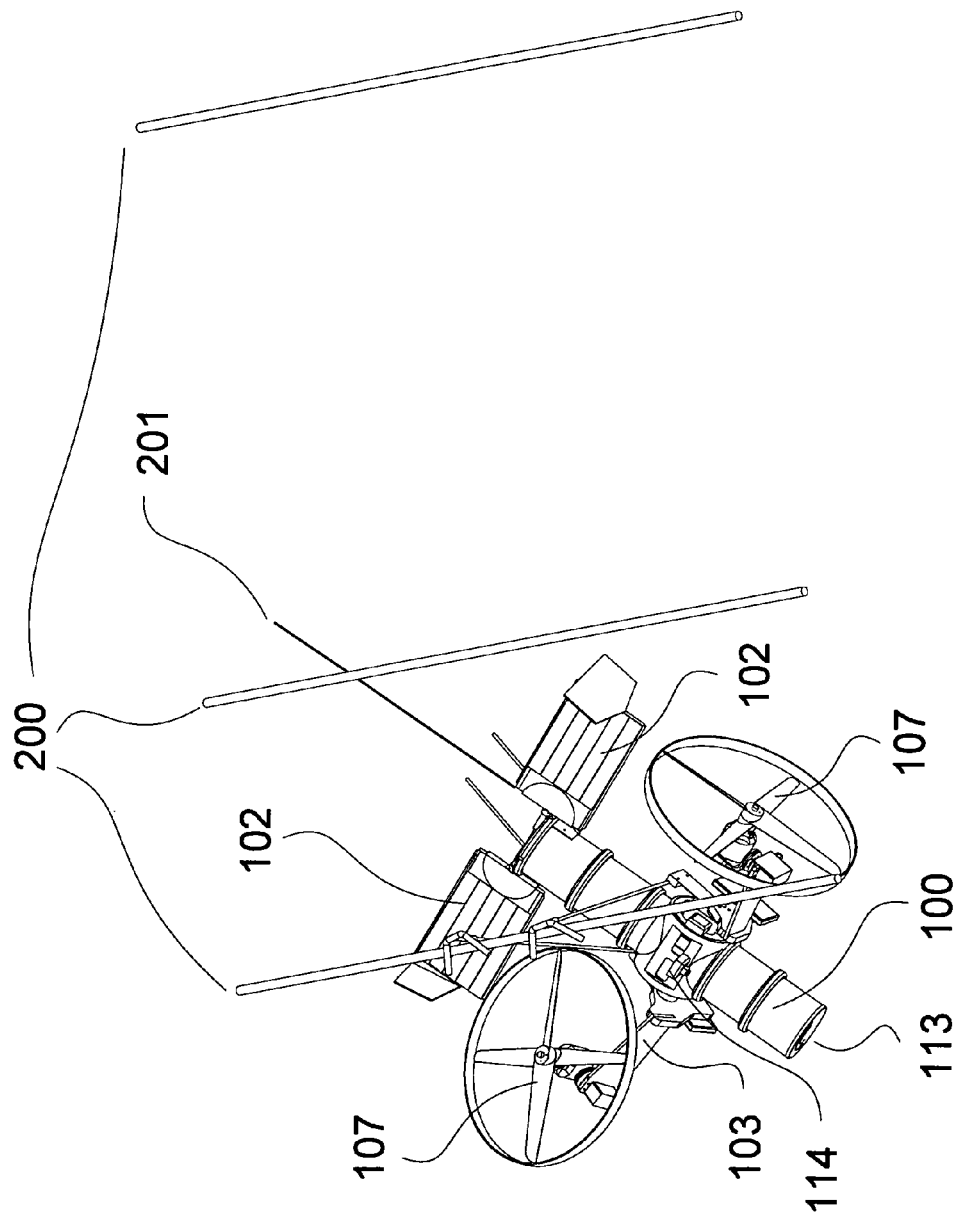
Figure 3B:
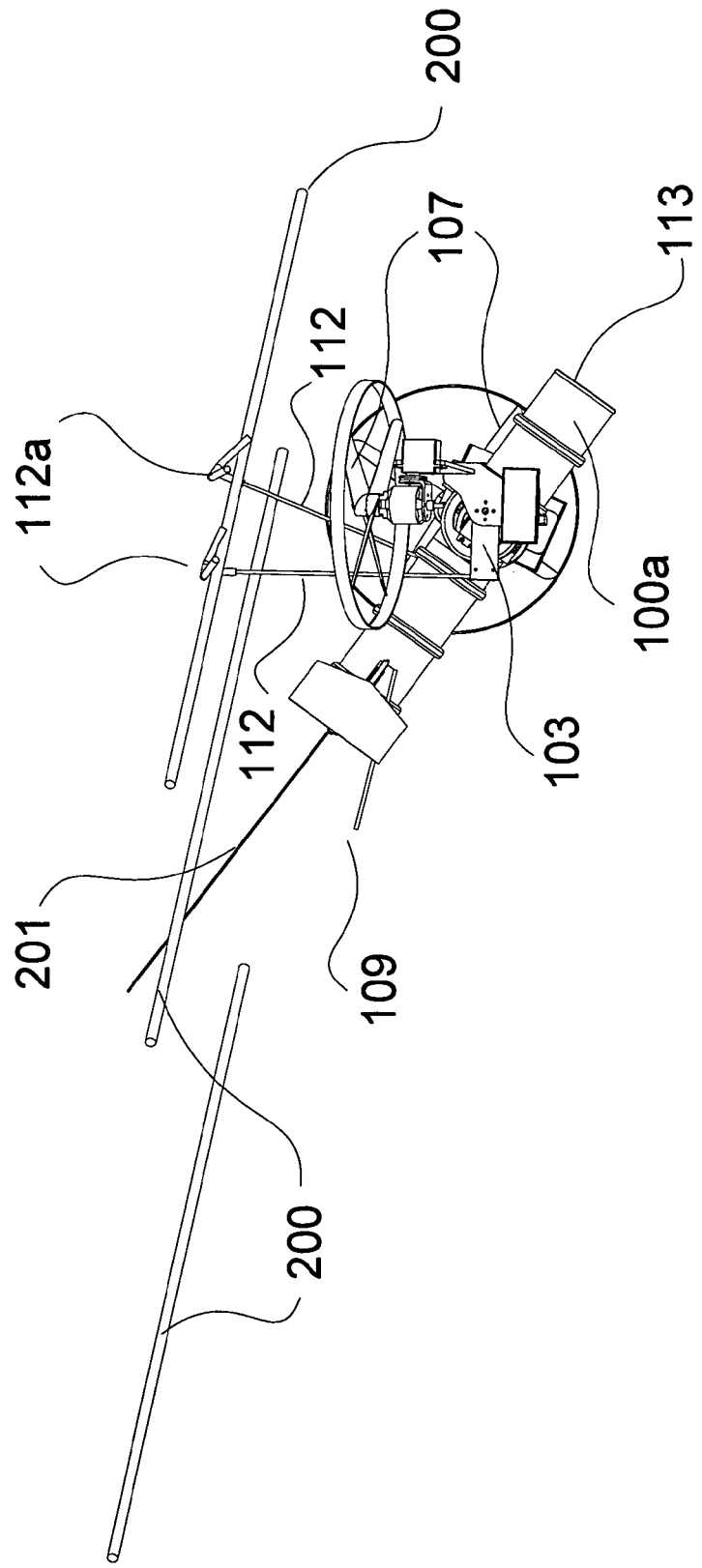
Figure 3C:
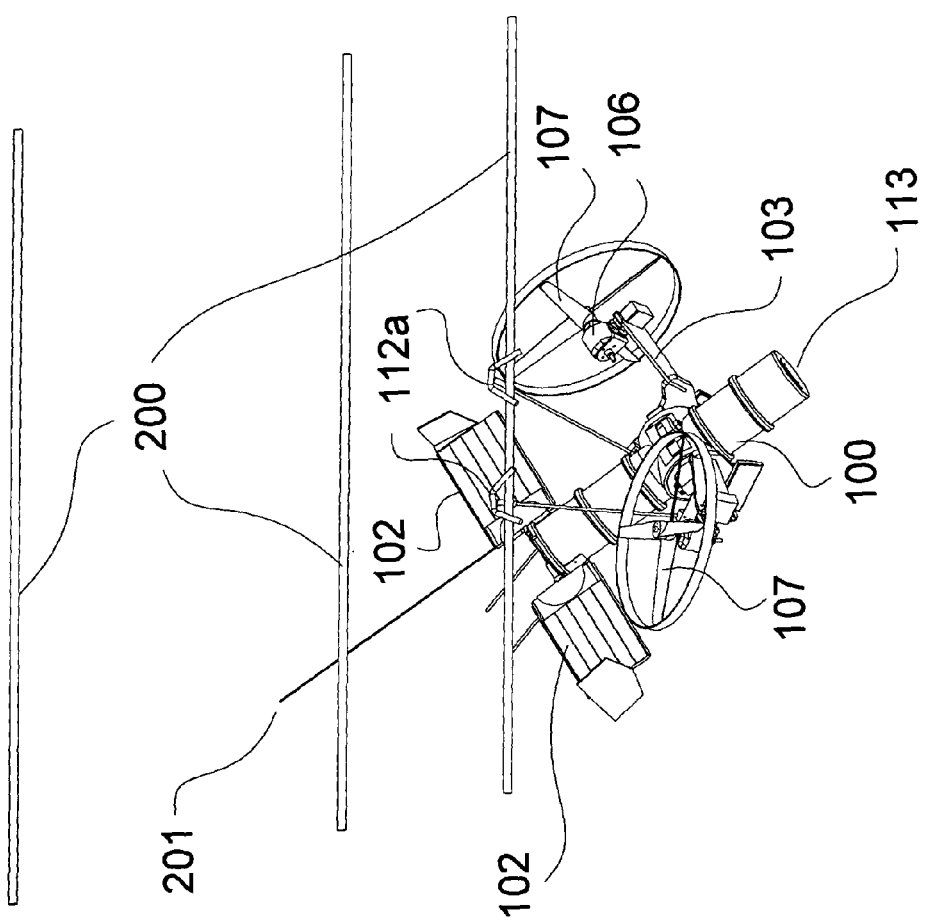
Figure 4A:
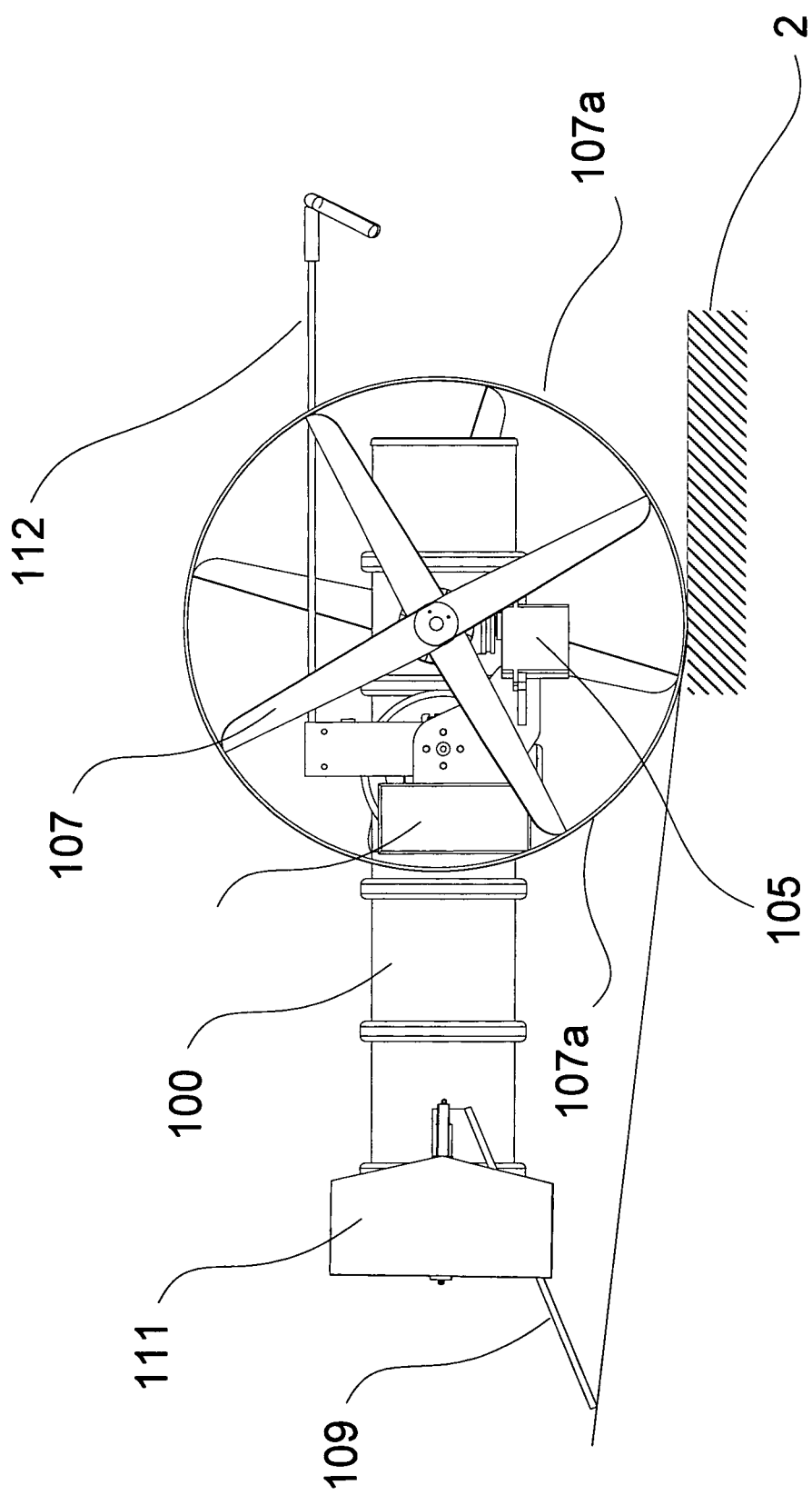
Figure 5A:
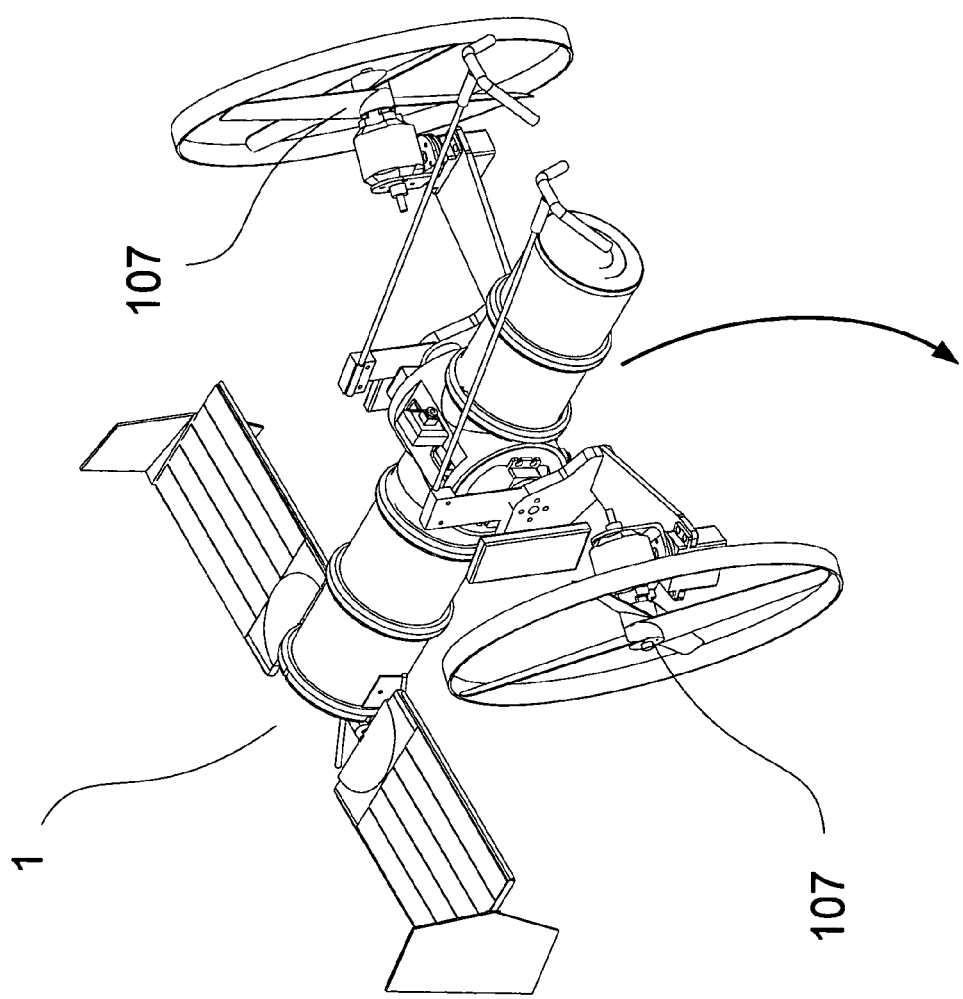
Figure 5C:
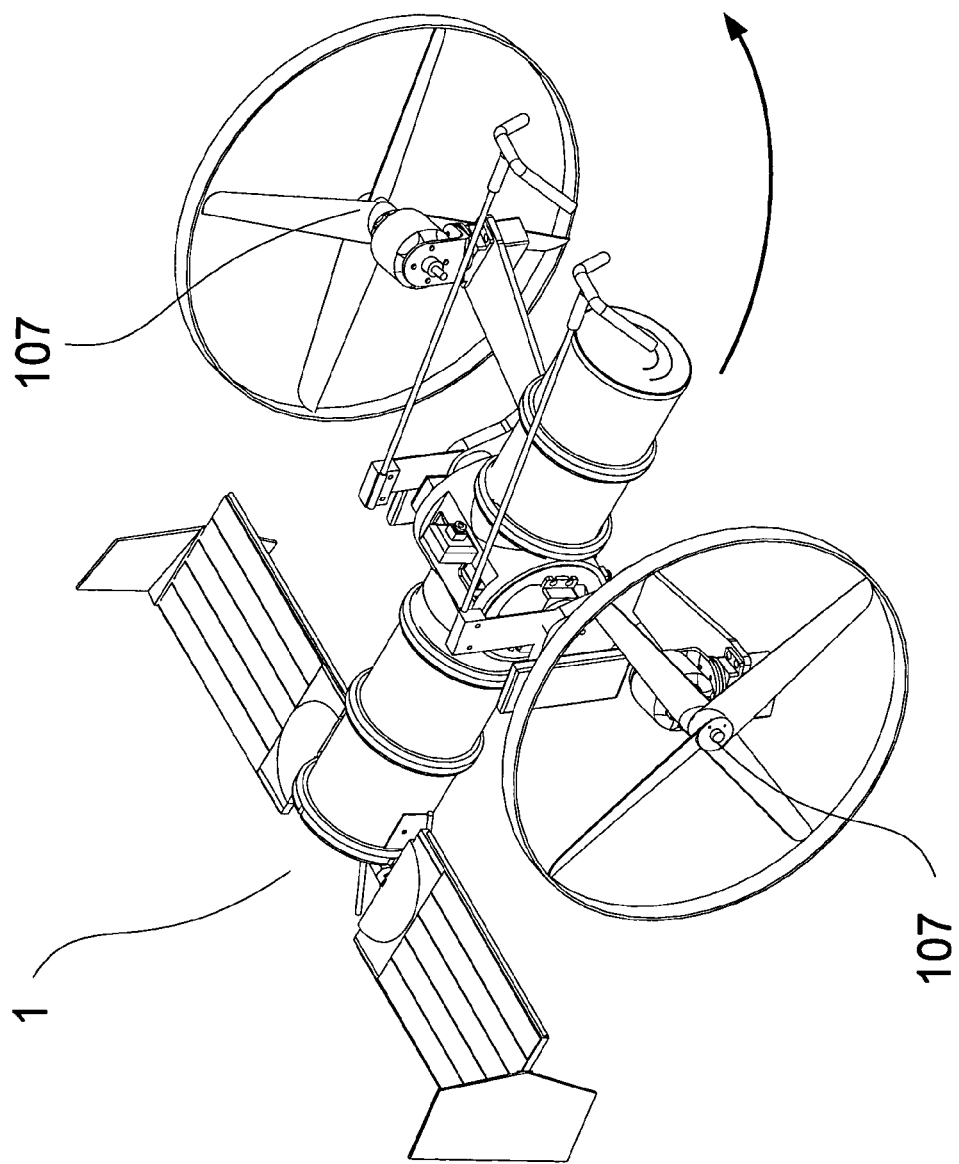
Figure 6:
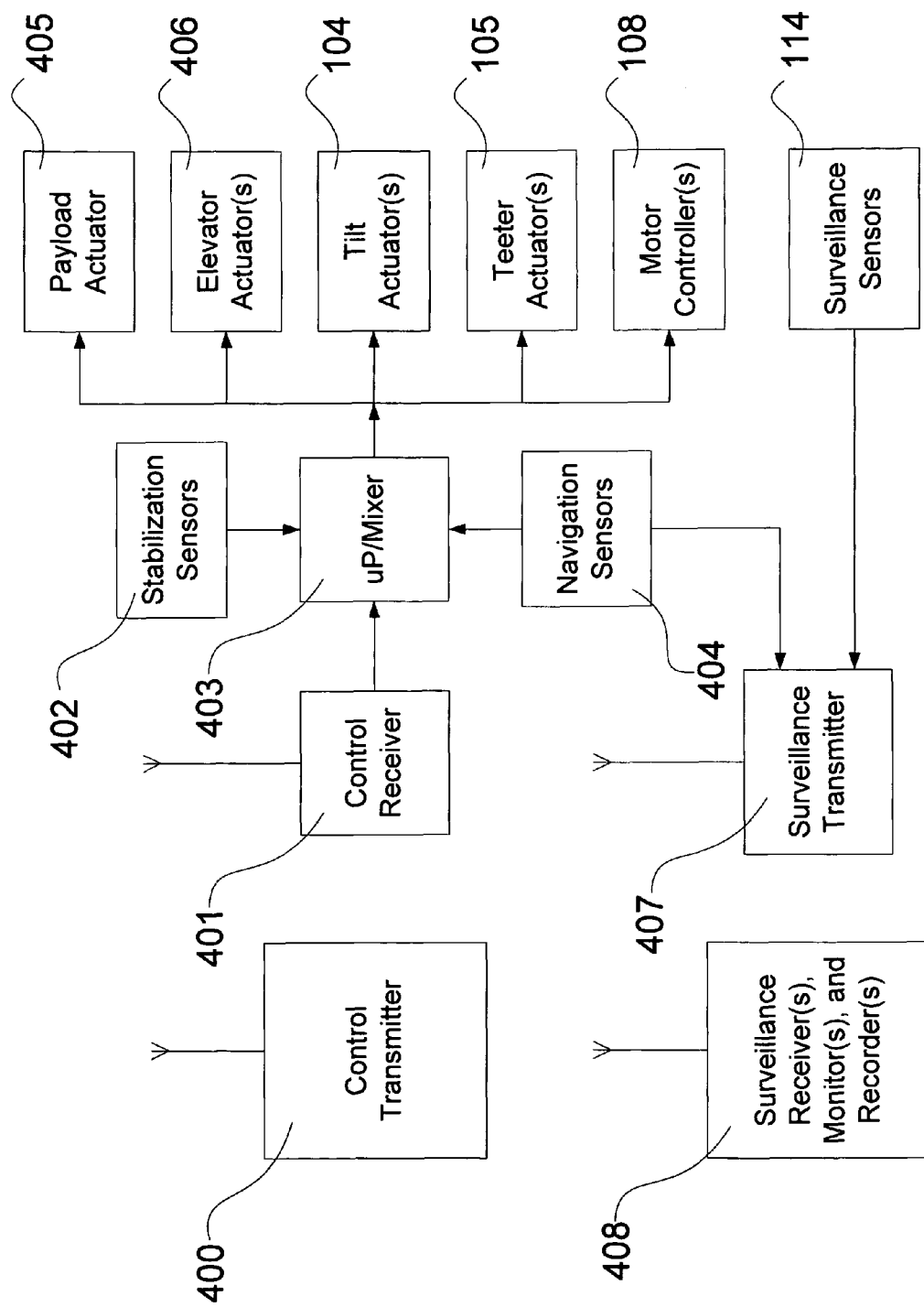
Figure 7:
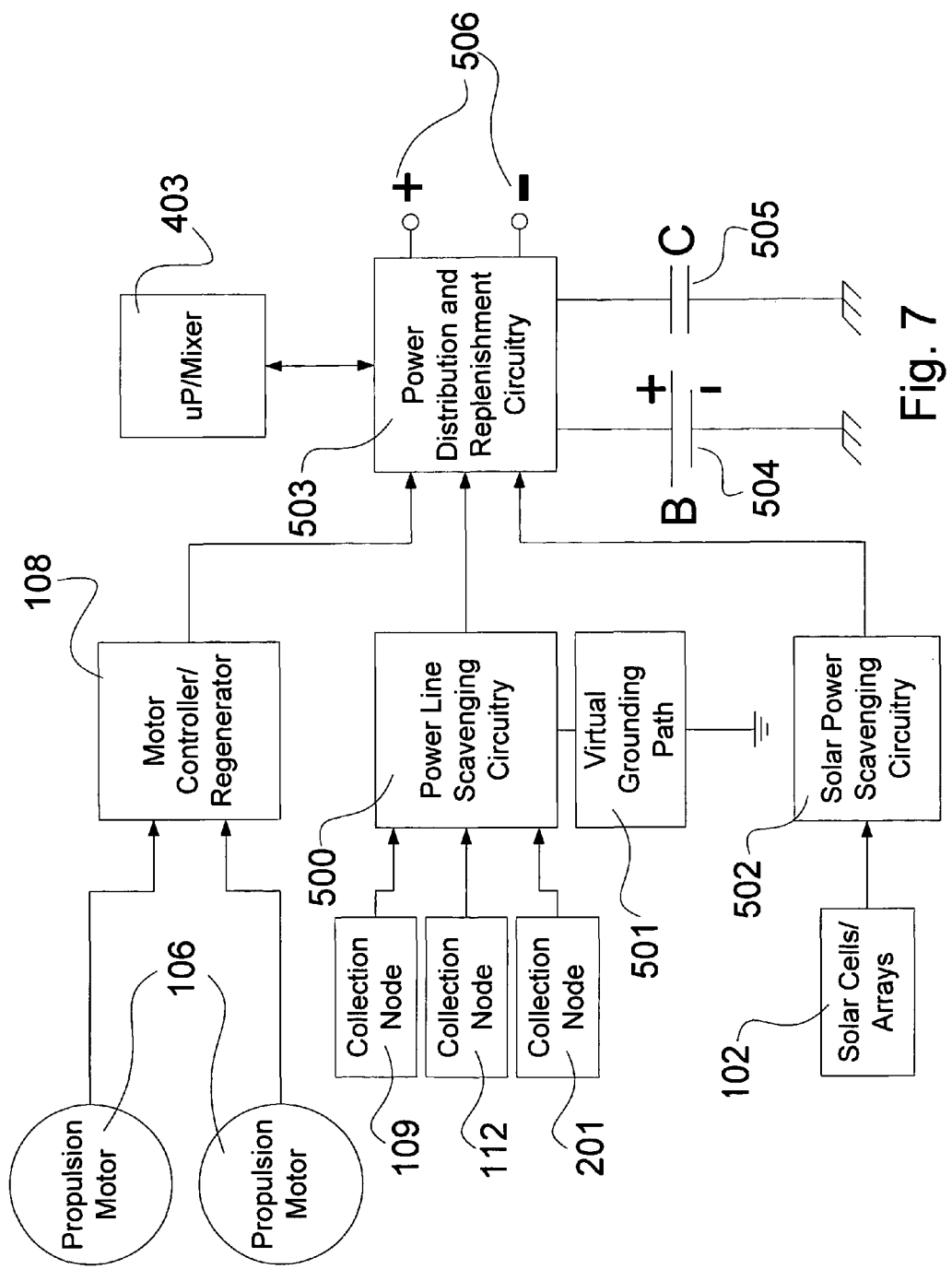
Figure 8:
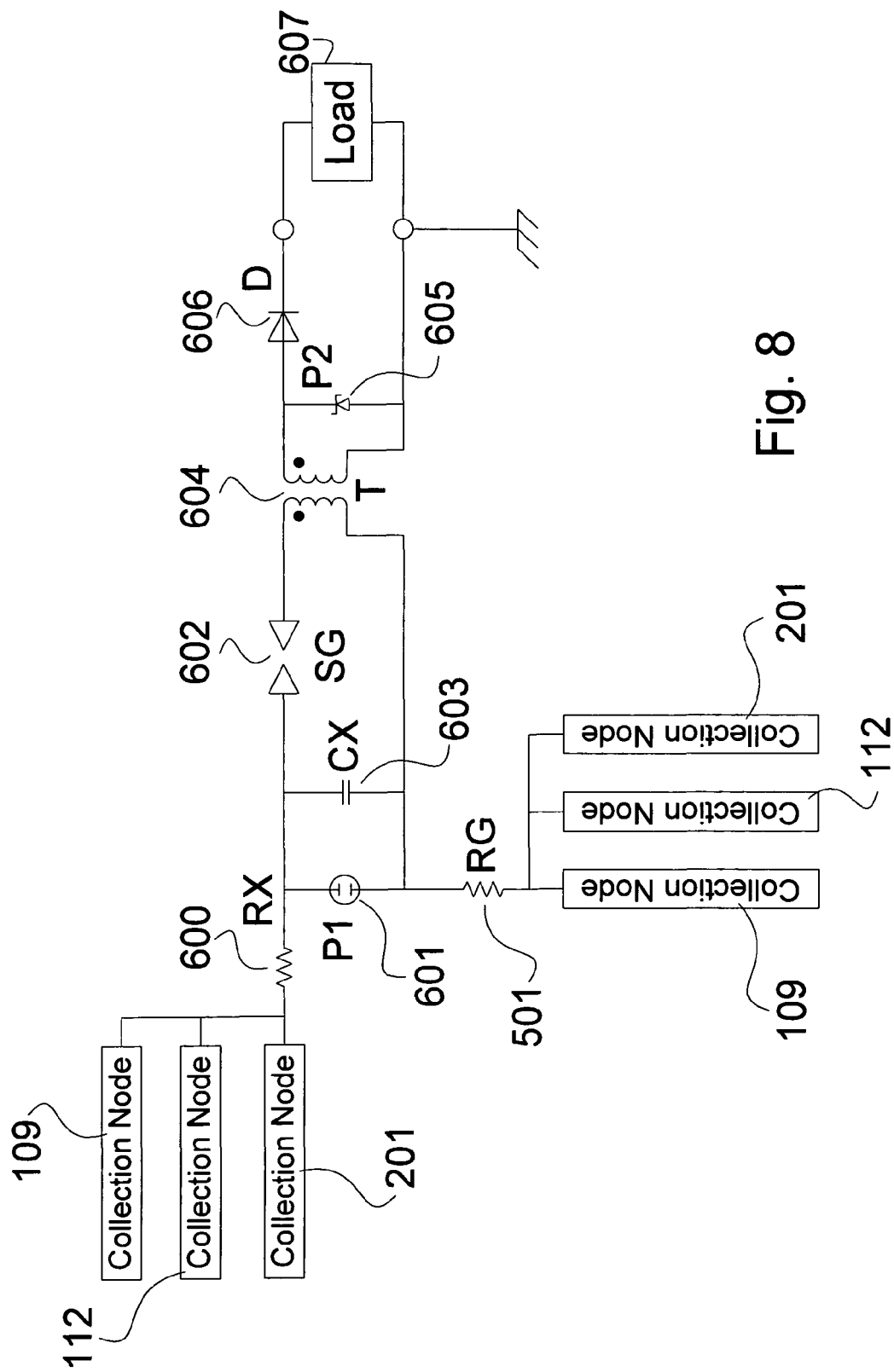
Figure 9A:
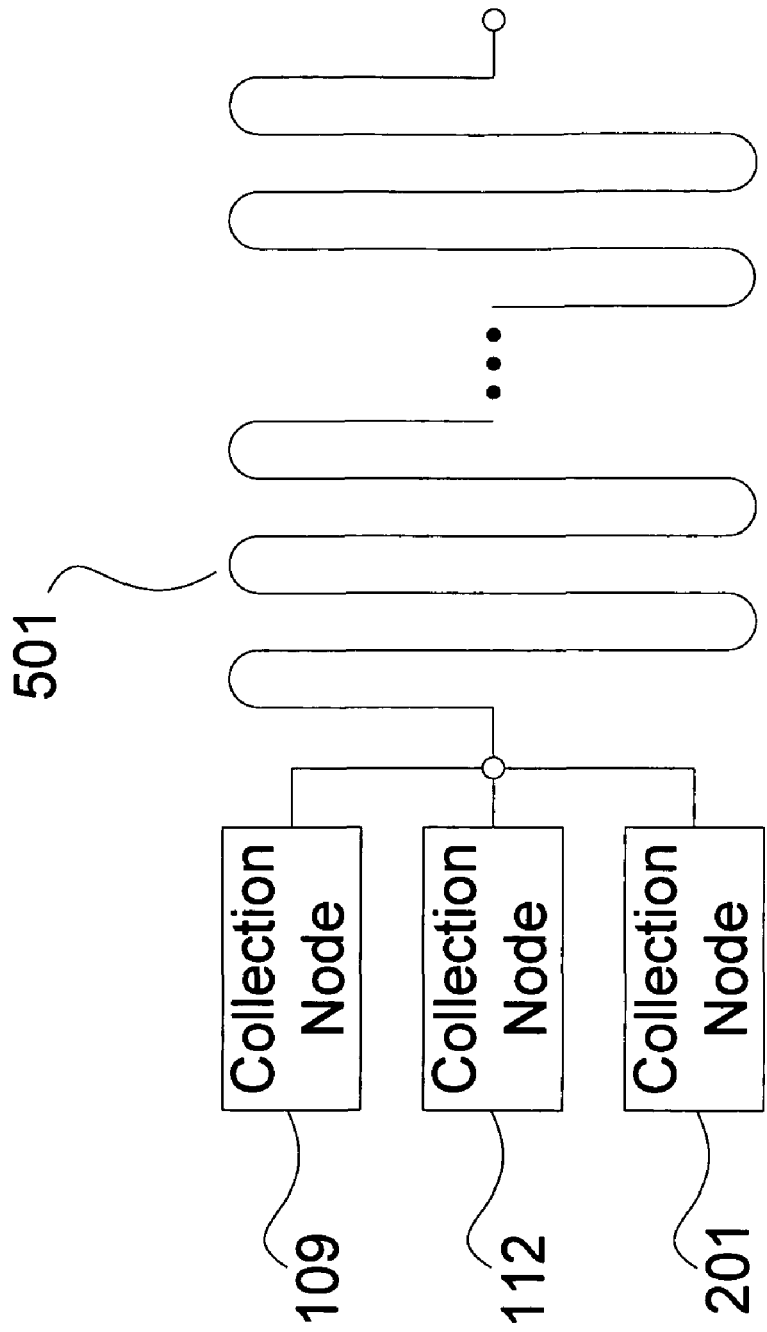

FIGS. 1a-d shows four plan form views of the preferred embodiment, illustrating insect-like flight, propulsion, and balance features of the micro air vehicle, surveillance and scavenging apparatus, and overall micro air vehicle in topology in hovering and slow flight configuration FIG. 2a-c shows illustrations of preferred embodiment teeter action, example takeoff and landing sequence of the preferred embodiment, and preferred embodiment tilt and elevator action FIG. 3a-c shows three views of the preferred embodiment while perching on an elevated three wire distribution circuit FIG. 4a and b show two views of the preferred embodiment in crawling configuration FIG. 5a-c shows examples of crawling navigation FIG. 6 shows a block diagram of the preferred embodiment control system FIG. 7 shows a block diagram of the preferred embodiment energy scavenging system FIG. 8 shows a simplified circuit diagram of the preferred embodiment power line scavenging circuitry FIG. 9 shows a simplified circuit diagram of the preferred embodiment corona based virtual ground

| DRAWINGS - Reference Numerals | |
|---|---|
| 1 | the preferred embodiment insect-like MAV |
| 2 | open terra firma or other semi-prepared surface |
| 3 | insect-like body flight angle of the preferred embodiment |
| 100 | body comprising upper (100a), center (100b), and lower (100c) portions |
| 101 | left and right elevators |
| 102 | left and right solar panels |
| 103 | left and right rotor arms |
| 104 | left and right rotor tilt actuators |
| 105 | left and right rotor teeter actuators |
| 106 | left and right propulsion motor |
| 107 | left and right rotor with rim like feature 107a |
| 108 | left and right electronic motor control |
| 109 | left and right landing tail skid and energy collector |
| 110 | elevator pivot shaft |
| 111 | right and left winglet |
| 112 | right and left perch hanger |
| 113 | offensive payload cap |
| 114 | surveillance sensors |
| 115 | body rings |
| 200 | perching object such as power line or tree limb |
| 201 | multi phase scavenging collection whip |
| 400 | flight control transmitter |
| 401 | flight control receiver |
| 402 | six degree of freedom motion sensors |
| 403 | main microprocessor and signal mixer |
| 404 | navigation sensors |
| 405 | payload expulsion actuator |
| 406 | elevator actuator(s) |
| 407 | surveillance transmitter |
| 408 | surveillance receiver(s), monitor(s), and recorder(s) |
| 500 | power line scavenging circuitry |
| 501 | corona virtual ground |
| 502 | solar power conditioning circuitry |
| 503 | power distribution and replenishment circuitry |
| 504 | long term energy storage |
| 505 | short term energy storage |
| 506 | main power bus terminals |
| 600 | relaxation resistor |
| 601 | protective shunt device |
| 602 | spark gap |
| 603 | relaxation capacitor |
| 604 | step down transformer |
| 605 | protective shunt device |
| 606 | relaxation oscillation rectifier(s) |
| 607 | example loading circuits |
| 700 | example virtual ground conductor cross section |
| 701 | example corona ionic currents |

DETAILED DESCRIPTION

FIGS. 1-9—Preferred Embodiment

In FIGS. 1a, b, c, and d, body 100 comprises upper 100a, middle 100b and lower 100c portions. On either side of body are attached left and right tilt actuators 104, which allow left and right rotor arms 103 to tilt in concert or differentially on a tilt axis parallel to the illustrated Y axis. Notably, this articulation allows movement of each rotor arm in a complete circular arc, if necessary, while tilt actuators 104 may be programmed to limit motion to less than a complete circular arc due to configuration and physical interference constraints. Body 100 may have any of a plurality of cross sections including circular, such as oval, oblong, asymmetric, or any other cross section that suits vehicle aerodynamics and internal carriage. Body extremities 100a and 100c may be tapered or blunt as needed for a given mission or objective. Attached to right and left rotor arms 103 are right and left teeter actuators 105, which support and teeter right and left propulsion motors 106 and right and left rotors 107 on axes parallel to the illustrated X axis. Notably, left and right teeter actuators 105 may be programmed to allow rotation about the teeter axis in a complete circular arc or any sub arc as dictated by configuration and constraints. Significantly, the combined motion provided by tilt actuators 104 and teeter actuators 105 allows downward thrust from rotors 107 to be independently vectored anywhere in the illustrated X-Y plane, comprising an insect's ability to direct downward thrust at will from pairs of wings on either side of a central abdomen. Rotors 107 are set at an outward dihedral angle, achieved through proper positioning or programming of teeter actuators 105, pointing away from body 100a, 100b, and 100c, to provide vehicle stability about the X (roll) axis. Rotors 107 may be two, three, four, or have a plurality of blades and may or may not have individual blade pitch control capability. Rotors 107 turn in opposite directions to balance reaction torque on body 100. Significantly, rotors 107 have a rim or similar, continuous or non continuous, circumferential feature that allows them to roll along a surface without damaging individual blade tips or airfoils, and which supplied sufficient traction on prepared surfaces to allow rotors 107 to function as wheels for crawling.

Elevators 101 are positioned at the rear of body 100 and pivot in concert or individually on elevator shaft or pinion 110. Left and right winglets 111 are attached to left and right elevators 101 at an angle to properly intercept the thrust from rotors 107 and provide decoupling of aerodynamic forces in the Z (yaw) and roll (X) directions. Notably, body parts 100a, 100b, and 100c and left and right elevators 101 comprise the ability of insects to control hover and translational flight by repositioning a dangling abdomen to redistribute weight, center of gravity, and deflect downward thrust.

Motor controllers 108 are positioned at the bottom of rotor arms 103 to act as counter balance masses to the teeter actuators 105 and propulsion motors 106 for motion about the axes of tilt actuators 104 and notably position them in rotor 107 slip stream for cooling. Motor controllers 108 may control motor revolutions per minute, direction of rotation, output torque, current or power drawn, or any other necessary variable as dictated by configuration. Propulsion 106 motors may be electrical, internal combustion two or four cycle, or any other technology that has sufficient thrust to weight ratio.

Landing and tail skids 109 are positioned at the bottom of body 100 to provide pivot points for landing so that body 100a, 100b, and 100c may be transitioned from vertical to horizontal for crawling. When body 100a, 100b, and 100c is horizontal, tail skids 109 provide the sliding surface to keep the rear of body 100 and winglets 111 from interference with the crawling surface. Tail skids 109 may also be equipped with conductive collectors to provide conductors for energy scavenging and replenishment, and may comprise Teflon slipping surfaces, small tail wheels, or other friction reducing mechanism to suit motion across and anticipated surface. Tail skids 109 may also function as or support various RF antennas needed for control and surveillance functions of the preferred embodiment 1.

Perch hangers 112 are flexible extensions rigidly attached to rotor arms 103 and comprise at their ends grappling apparatus 112a suited for engaging and retaining overhead power lines, tree limbs, and other objects for perching. Significantly, grapples 112a may rotate about the long axis of perch hangers 112, allowing repositioning of body 100a, 100b, and 100c axis in the X-Y and X-Z planes while perched. Perch hangers 112 may be of any length suited for the perching mission, and their grapples 112a may consist of fingers, hooks, magnets, latches, or any such mechanism that would be useful for temporarily suspending the preferred embodiment 1 on a power line, tree limb, building edge, or other object. Grapples 112a may be conductive, resistive, or insulating as is needed for power line scavenging using corona discharge methods. Perch hangers 112 may serve as or support various RF antennas needed for control and surveillance functions of preferred embodiment 1.

Surveillance sensors 114 may include miniature cameras, audio microphones, night vision sensors, infrared sensors, and other devices suited for observation and intelligence collection, and are mounted on appropriate positions on body 100 to give sufficiently wide surveillance field of view. Body rings 115 serve as strengthening and stiffening members and provide the illusion of insulating or general power distribution apparatus when the invention is perched on a power line or building.

For solar scavenging, left and right solar panels 102 may be positioned on right and left elevators 101, and may be carried on both upper and lower surfaces.

An offensive payload is carried in the upper portion 100a of body 100 behind end cap 113, and may be expelled by chemical, mechanical, or electromagnetic means over short distances. The offensive payload may consist of any explosive or ordinance that may fit in the upper portion of body 100 and is sufficiently lightweight and effective enough for carriage. Significantly, the ability to aim body 100 while perched and the ability to expel an offensive payload from body upper portion 100a allows the offensive payload to be aimed and discharged at a target that is being observed by surveillance sensors 114.

FIG. 2a illustrates the coordinated teeter motion of rotors 107 effected by teeter actuators 105, with respect to the preferred embodiment 1.

FIG. 2b illustrates takeoff and over of the preferred embodiment 1. Initially the preferred embodiment is landed and in crawling configuration. Rotors 107 are teetered using teeter actuators 105 and tilted using tilt actuators 104 while propulsion motors 106 are commanded to hovering thrust from motor controllers 108, balancing body 100 horizontally with respect to landing surface or terra firma 2. Notably, power to propulsion motors 106 is simultaneously advanced while rotor arms 103 are tilted allowing hover with notably body 100 now hanging vertically and maintaining stability because of this vertical suspension and center of gravity positioned below the axis of rotor arm actuators 104. Significantly, body 100, elevators 101, rotor arms 103, propulsion motors 106, and rotors 107 are then tilted to achieve a configuration giving translational motion with body 100 at a large angle alpha 3 with respect to motion, notably comprising an insect-like flight configuration of dangling an abdomen which may be used to control center of gravity, pitch (Y axis), and lift deflection. Significantly, this sequence of events is simply reversed to achieve static hover and landing.

FIG. 2c illustrates the rotor arm tilt, both in concert and differential, provided by tilt actuators 104 about their axis of rotation.

FIGS. 3a, b, and c show the preferred embodiment scavenging energy from the environment. In a plurality of means, energy is scavenged using propulsion motors 106, collection nodes comprising landing and tail skids 109, collection nodes comprising perch hangers 112 and grapples 112a, and collection nodes comprising multi phase collection whip 201. When turned through reclamation of forward motion, turned by impinging air, or by other means, rotors 107 impart torque to propulsion motors 106 provide energy to motor controller/regenerators 108. Motor controller/regenerators 108 provide the correct phasing and power conditioning for input to poser distribution and replenishment circuitry 503.

When in contact with or in close proximity to power line distribution conductors 200, tail skids 109, perch hangers 112, and multi phase collection whip 201 provide the ability to collect energy from the electric field surrounding a conductor 200 or by diverting electron flow in the conductor to a lower potential. Significantly, the diversion of such electron flow from conductors 200 does not need to provide a closed circuit, provide physical contact, or expose the preferred embodiment to arcing or shorting between distribution phases and/or grounding points. Collection and diversion from distribution conductors 200 may employ corona effects where near breakdown of the surrounding air is used to provide a useful voltage drop and some current regulation, and prevents the so called 'crowbar effect' and possible damage or arcing to the preferred embodiment 1 and thus possible damage. Virtual grounding path 501 may be a conductor of proper length and sharpness of radius to use coronal effects to dissipate sufficient charge to the atmosphere and thus provide a virtual complete circuit. Virtual ground 501 may also comprise a physical or coronal connection to a second phase of a multi phase system, resulting in coronal ionic current to the atmosphere consisting of milliamperes flowing between kilovolts of potential, and thus imparting watts of power while scavenging.

Significantly, the ability of grapples 112a to rotate on the log axis of perch hangers 112, the rigid attachment of perch hangers 112 to rotor arms 103, and the flexibility of perch hangers 112 allow the preferred embodiment 1 to be aimed at large angles in the horizontal (X-Y) plane and large angles in the vertical (X-Z) plane with respect to the perching conductors 200, allowing an object of interest to be tracked directly through the use of rotor arm 103 tilt. Additionally, the shape and material composition of grapples 112a allow them to slide along conductor 200, allowing large angles of differential rotor arm 103 tilt to give large angles between body 100 and distribution conductors 200 while perched. Notably, this allows upper body 100a and end cap 113 to be aimed at the target along with surveillance sensors 114, allowing expulsion of an offensive payload at the target if desired.

Power line scavenging circuitry 500 employs spark gap relaxation techniques well known in the state of the art to provide a high frequency AC current from an AC or DC distribution conductor. This relaxation current is then passed through appropriately sized, light weight voltage transformation circuitry and rectified to provide electronics level voltage and current for on board energy replenishment, which is in turn provided to power distribution and replenishment circuitry 503.

Solar panels 102 may be positioned at optimum collection angle by micro processing block 403 and provide energy to solar power conditioning circuitry 502 which in turn determines the maximum power point of the solar cells and performs voltage boosting and bucking accordingly. Based on the phase of the mission, uP/mixer 403 determines which destination, long term storage B 504, short term storage C 505, or the system power bus 506 is best served with the scavenged power and provides voltage and current accordingly. Power may be sent to any one, two, or all of destinations B 504, C 505, or power bus (currently running equipment) 506 depending on the need for current or future motion, the need for transmission of surveillance, or the current capacities or replenishment rates required by B 504, C 505, or the system power bus need (the currently running circuitry) 506.

FIGS. 4a and b illustrate two views of the preferred embodiment 1 in crawling configuration. In this configuration, rotor arms 103 tilt on tilt actuators 104 and rotors 107 and propulsion motors 106 teeter to function as propulsion wheels and to lift body approximately horizontal to the crawling surface or terra firma 2. Significantly, rotors 107 comprise rim like circumferential feature 107a that provides protection for rotor 107 blade tips and sufficient traction for efficient function of rotors 107 as propulsion wheels. Rotor rim 107a may comprise complete annular feature, a partially annular feature, a swept back scimitar extension to rotor 107 tips, or may have any other development that provides constant diameter and sufficient contact area with crawling surface 2. Tail and landing skids 109 maintain body 100 in roughly a horizontal stature, notably comprising insect-like crawling having abdomen horizontally supported by propulsive legs.

FIGS. 5a, b, and c illustrate terrestrial navigation of the preferred embodiment 1 utilizing rotor teeter actuators 105 as steering functions, turning left, turning right, and teetered for pivoting about tail skid 109 contact with the crawling surface 2. Significantly, motor controllers 108 may be used with teeter actuators 105 to simultaneously modulate teeter (steering) direction as well as individual rotor speed and direction of rotation to achieve small and quick turning radii.

FIG. 6 illustrates the control, stabilization, navigation, and surveillance block diagram that comprise the mission functions of preferred embodiment 1. Control transmitter 400, in the possession of the operator, comprising control sticks, switches, buttons, sliders, and other input mechanisms sufficient for issuing motion control commands for the preferred embodiment 1 as manipulated by the operator. Significantly, control transmitter 400 may operate on any frequency suited to the required data bandwidth and reception range, and may contain control channel and control signal mixing and processing suitable for flight stability, mode of operation, and weight reduction aboard the preferred embodiment 1.

Control receiver 401 is carried in body 100 and receives commands from control transmitter 400 and forwards them to central micro processing block 403. Micro processing block 403 also receives information stabilization sensors 402 and navigation sensors 404. Stabilization sensors comprise three orthogonal accelerations and three orthogonal rates of rotation, to provide micro processing block 403 with sufficient information to ascertain the position of body 100 in free space, giving the ability for insect-like flight. Navigation sensors 404 comprise GPS latitude, longitude, speed, and altitude information as well as infra red detection of the visible horizon. With the data from stabilization sensor block 402, the micro processing block 403 uses common proportional, proportional integral, proportional integral derivative, linear quadratic regulator, and inverted pendulum control techniques along with specific models and observers for the aerodynamics and dynamic response of the preferred embodiment 1 to interpret operator commands collected by control receiver 401 and execute these commands while maintaining the stability of preferred embodiment 1 in flight.

Micro processing block 403 effects coordinated control through a plurality of signals to payload actuator 405, elevator actuators 406, tilt actuators 104, teeter actuators 105, and motor controllers 108. Using the GPS data available from navigation sensors 404, micro processing block 403 may provide a GPS position, velocity, and altitude heads up display or overlay to surveillance transmitter 407 which may be displayed on surveillance receivers, monitors, and recorders 408.

Surveillance sensors 114 provide data to surveillance transmitter 407. These data may be audio, video, night vision spectrum, or other types of intelligence as needed by the mission. Surveillance transmitter 407 may operate on the same or a different frequency from that of control transmitter 400. Surveillance receiver 408 receives the transmitted data and displays and records it. Significantly, a plurality of surveillance receivers may be used by a plurality of operators or a plurality of observers interested in the data being collected. Notably, control transmitter 400 and control receiver 408 may be contained in a separate housing, in the same housing, or temporarily attached to each other for ease of use.

FIGS. 7 and 8 illustrate the block diagram of the functions that comprise the energy scavenging capabilities of preferred embodiment 1 and the simplified circuit diagram of power line scavenging circuitry 500 respectively. Energy gathered by collection nodes 109, 112, and 210 may be obtained via direct contact with low potential conductors 200 or close proximity (through electric field and coronal effects) to high potential conductors 200. Significantly, virtual ground 501 may be in contact with or in close proximity to a second phase, conductor, or ground point 200. Virtual ground 501 is illustrated as representing the impedance of corona effects brought about by use of a serpentine conductor, carried on the exterior of the preferred embodiment or elsewhere in or on the preferred embodiment, of the proper length and sharpness of radius, well known in the state of the art, able to produce a sustained corona discharge current in air, of either positive or negative ionic polarity, and thus provide a sink for charge capable of sustaining scavenging currents of milliampere volume through kilovolt potentials for watts of scavenged power.

Resistor 600, capacitor 603, and spark gap 602 comprise a relaxation oscillator. Due to the corona current dissipated in virtual ground 501 and the high potential of the scavenged electric field, capacitor 603 charges quickly through resistor 600 to the spark over voltage of spark gap 602, at which point capacitor 603 is discharged with little impedance into transformer 604. Transformer 604 has proper primary and secondary winding ratios and impedances to permit efficient operation with relaxation oscillator comprising resistor 600, capacitor 603, and spark gap 602, as well as proper matching with a plurality of rectifiers 606 and the various loads 607 in power distribution and replenishment circuitry 503, methods for achieving this suitability all well known in the state of the art. The charge discharge relaxation cycle repeats itself at a great multiple of the power line frequency (if the power lines use AC transmission) or at high frequency (if the power lines use DC transmission), resulting in greatly reduced size and weight of resistor 600, capacitor 603, spark gap 602, transformer 604, and rectifiers 606 to advantage for weight reduction of preferred embodiment 1. Power distribution and replenishment circuitry 503 distributes scavenged power long term storage 504, short term storage 505, and the system bus 506 of preferred embodiment 1 in optimal fashion for mission and overall operation. Protective devices 601 and 605 provide shunt paths in the event of overvoltage. Long term power storage 504 may be modern high capacity batteries such as lithium polymer or lithium ion or other chemistry suited to the size and mission of preferred embodiment 1. Short term storage 505 may be super or ultra capacitor devices or other storage technology suited for rapid transfer of energy to the preferred embodiment 1, at the expense of retention time. Significantly, power distribution and replenishment circuitry 503 may transfer energy from short term storage to long term storage or vice versa as dictated by the mission requirements of preferred embodiment 1. Power distribution and replenishment circuitry 503 provides the proper voltage and current levels for charging, balancing, charge shuttling, and discharging long term storage 504 and short term storage 505, according the well known state of the art methods for long term storage 504 and short term storage 505. Notably, power distribution and replenishment circuitry 503 additionally supplies the proper voltage buck or boost capabilities to interface a plurality of disparate energy sources 106, 109, 112, 201, and 102.

Motor controller/regenerator 108 commutates and rectifies the sinusoidal waveforms obtained from propulsion motors being spun by wind or other forces and provides this scavenged energy to power distribution and replenishment circuitry 503 with proper voltage conditioning. Solar power scavenging circuitry 502 comprises maximum power point using techniques well known in the state of the art and proper voltage conditioning to operate solar arrays 102 at their optimum, given the orientation of elevators 101 to the solar flux.

FIG. 9 shows a schematic view of the virtual ground, which may be carried on a plurality of external surfaces of preferred embodiment 1. Significantly, electrical circuit path 501 is attached on one end to collection nodes 109, 112, and 201 which provide the capability of contact or coronal based, electric field communication with a nearby conductor at potential, as well as creating watts/meter corona discharge values suited for energy replenishment of preferred embodiment 1. At the other end, circuit path 501 is available for connection to power line scavenging circuitry 500. Cross section 700 of circuit path 501 is of sufficiently sharp radius such that corona inception voltage is achieved and its effect enhanced, producing ionic corona currents 701 of positive or negative nature, providing a path for milliamperes of scavenged current at kilovolt levels to power line scavenging circuitry 500.

Operation—FIGS. 1-9

The preferred embodiment is launched by the operator using control transmitter 400 from either the prone position of FIGS. 2*b* and 4*a* or hand launched with body 100 in the vertical flight position illustrated in FIGS. 1*b* and *c*. From the prone position, rotor arms 103 are rotated upwards and rotors teetered on teeter actuators 105 to be horizontal. The preferred embodiment 1 is steadied in this position by tail skids 109 and winglets 111. The command to motor controllers 108 is advanced to hovering thrust levels, and as the body 100 lifts off the ground, rotor arms 103 are pivoted simultaneously to the position shown in FIG. 2*b* for hover, with body 100 hanging near vertical. For a hand launch configuration as depicted in FIG. 1, body 100*c* is supported vertically by hand and the commands to motor controllers 108 advanced to hovering thrust levels.

Using visual line of sight monitoring for direct control or first person view from surveillance sensors 114 and GPS position and waypoint settings from navigation sensors 404, the preferred embodiment is flown to the vicinity of the desired perch. Transitioning horizontally from one location to another, the preferred embodiment 1 flies at large angle alpha 3 caused by rotor 103 arm tilt and elevator 101 angle for pitch (Y axis) as shown in FIG. 2*b*. Turns are initiated by tilting rotor arms 103 in opposite directions for pirouetting about the yaw (Z axis), in conjunction with coordinated teeter of rotors 107 using teeter actuators 105 to produce roll (motion about the X axis). In the preferred embodiment, these commands are input by the operator to control transmitter 400 using control sticks commonly used in radio control equipment, employing the accepted conventions for pitch, roll, and yaw. Altitude for flight is adjusted through motor control 108 power setting or rotor 107 pitch angle or both methods. Position, altitude, and velocity position are calculated by uP/Mixer 403 using data from navigation sensors 404, and provided via heads up display or video overlay on surveillance receivers, monitors, and recorders 407.

After the operator has guided the preferred embodiment to the vicinity of the perch, or uP/mixer 403 has navigated the proper GPS waypoints to close vicinity of the perch, the preferred embodiment 1 is slowed to a hover as shown in FIG. 2b. Surveillance sensors 114 show the desired perch point 200. The preferred embodiment 1 is guided, at very low airspeed (inches per second), so that the perch object 200 (depicted as a single transmission line) is positioned between the end cap 113 and the perch grapplers 112a, a distance that may be 4-6 inches, allowing very easy and gentle capture of the perch 200. Once surveillance sensors 114 confirm perch 200 is in contact with perch hangers 112, the power command to motor controllers is ramped to idle and the preferred embodiment settles onto the perch, retained by perch hanger grapples 112a as depicted in FIG. 3.

Once perched, mildly flexible perch hangers 112 rigidly attached to rotor arms 103, differential tilt of rotor arms 103 allow the body 100 to be positioned at a large angle to the perch 200 and a large angle to the horizontal. This results in a cone of observation and detection approaching the entire field of view of surveillance sensors 114. The back field of view may be accessed partially by reversing the tilt of the body shown in FIG. 3, or by simply lifting off of the perch and re-perching pointing the opposite direction. In this manner, a view of nearly 360 degrees is possible.

While perched, perch hangers 112, perch hanger grapples 112a, and tails skids 109 are in close proximity to and/or in contact with perch 200, which in the case of a power distribution line is energized to at minimum several kilovolts. Using virtual ground 501 or by proper positioning scavenging whip 201, direct contact or corona currents may be established such that power line scavenging circuit 500 begins to operate and power distribution and replenishment circuitry 503 may begin recharge of long term storage 504 and short term storage 505. Additionally and as needed, elevators 101 may be positioned by elevator actuators 406 for the maximum power point of solar arrays 102, and solar power scavenging circuitry 502 may be utilized for replenishment of long term storage 504 and short term storage 505, or direct powering of any necessary function 506 (including the operation of power distribution and replenishment circuitry 503). Scavenging the available electrical field of perch 200 has great advantage of not being dependent on the power flowing at any instant to supplied distribution circuits. Also, the added weight, complexity, and relatively poor energy capture of clamp on magnetic systems may be avoided.

Additionally and as needed, one or both rotors 107 may be teetered using teeter actuators 105 to be in position to capture available wind currents as shown in FIG. 3.

If appropriate for mission success, the ability to position body 100 while perched may be used to track a target, and aim and expel the payload contained in fore body 100a at a propitious moment. After payload expulsion, the results of the offensive payload may be monitored, and when desired, rotor arms 103 may be both placed vertical, flight motors 106 advanced to hover, and the preferred embodiment detached from the perch. The preferred embodiment 1 then may be maneuvered to its point of origin directly by the operator, may reverse navigate GPS waypoints for return, or may be directed on another mission as necessary.

Figure 4B:
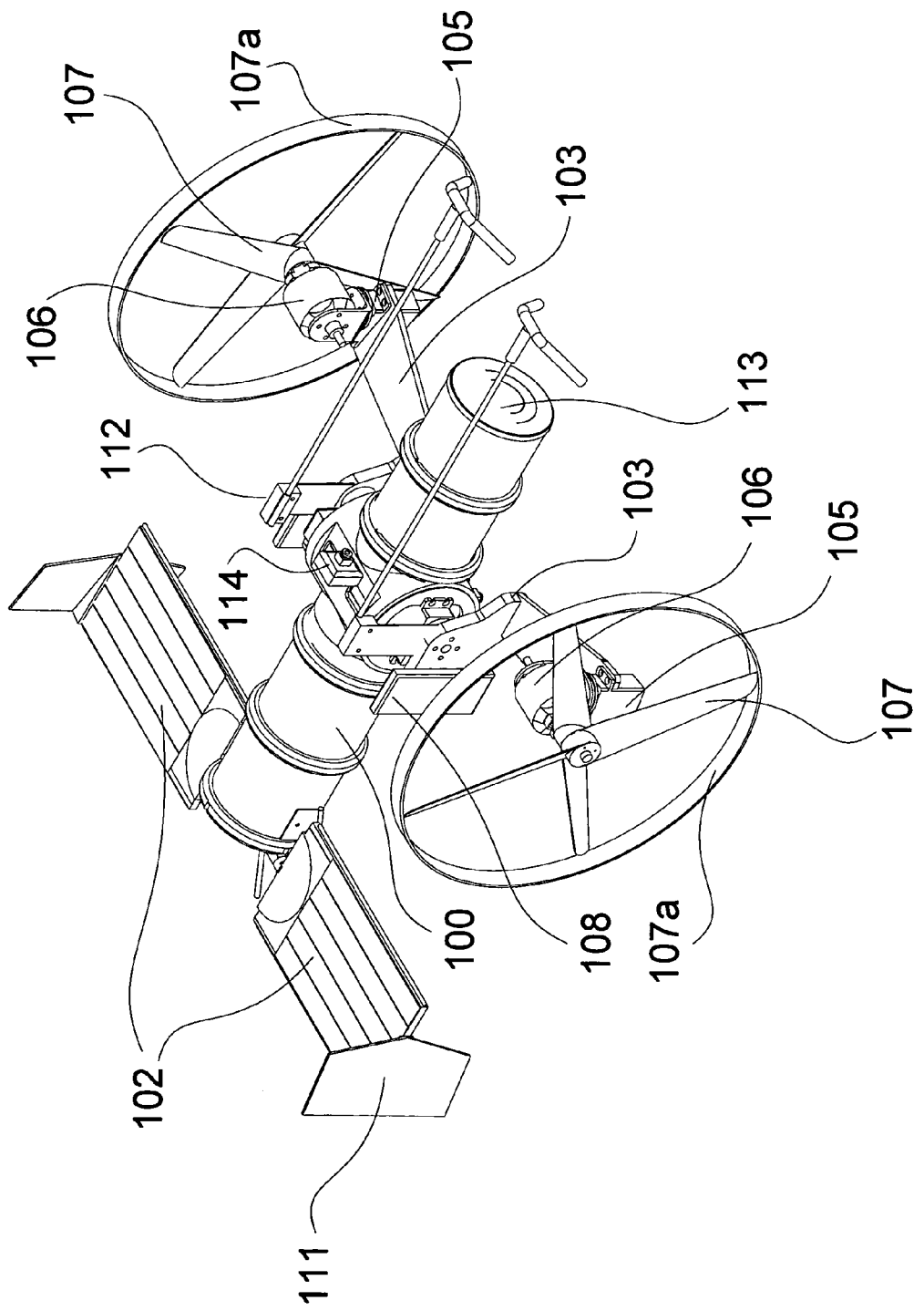

To perform surveillance on the ground, traverse expanses of relatively improved areas (such as airports, roads, or flat building roofs) or to approach vehicles, buildings, or persons on the ground, the operator or internal GPS guidance brings the preferred embodiment 1 to a hover over the desired landing site. In a simple reverse of the sequence shown in FIG. 2b, hover thrust produce by propulsion motors 106 is then slightly reduced until landing/tail skids 109 make contact with the landing surface. At this juncture, rotor arms 103 are rotated backward to maintain verticality and power command to propulsion motors 106 gradually reduced so that body 100 pivots downward until it rests prone on the landing surface. Propulsion motors 106 are then commanded to stop, and rotor arms 103 are tilted forward to be in line with body 100. Propulsion motors 106 are also teetered outward in opposing motion, rendering the position of rotors 107 as wheels turning on rotor rims 107a as depicted in FIG. 4. The preferred embodiment 1 then crawls on the surface, supported in the rear by the landing/tail skids, when motor controllers 108 advance command to propulsion motors 106 as in FIG. 4. Steering is accomplished by the operator or by GPS waypoint navigation using in concert teetering of propulsion motors 106 which provides normal two wheel steeling effect common to many vehicles, and by differential speed of rotation via differing commands to motor controllers 108 as in FIG. 5.

While crawling, the preferred embodiment 1 may execute many of the mission activities it may while perched, namely, loiter and transmission of surveillance, expulsion of payload at a proper time, and scavenging of solar energy. Upon completion of the crawling portion of a mission, the preferred embodiment 1 may return to the operator under direct or GPS waypoint control, by employing the same takeoff procedure from the prone position described above.

ADVANTAGES

From the prior description, numerous advantages and versatilities of the preferred embodiment are evident:

1. The insect-like topology of the preferred embodiment enables many concurrently useful, tightly integrated features:
   a. Small rotor 107 span to allow flight and crawl into cramped locations
   b. Counter rotating rotors 107 to eliminate torque effects
   c. Tilt actuators 104 and teeter actuators 105 may position rotor thrust in an entire plane of motion for excellent maneuverability
   d. Ability to use the body or abdomen 100 as a stabilization element with center of mass below rotor 107 plane of rotation
   e. Ability to place elevators 101 and winglets 111 directly in rotor slip stream for pitch and balance control via common inverted pendulum control methods
   f. Ability to control forward and backward motion with coordinated rotor arm 103 tilt and body 100 angle and elevator 101 position with respect to translational motion
   g. Ability to control yaw with differential rotor arm 103 tilt
   h. Ability to control roll with rotor teeter actuator 105 motion i. Ability to mount perch hangers 112 with various grapplers 112a for perching on various objects to rotor arms to allow aiming of body 100 when perched j. Ability to carry expellable payload in the for body 100a k. Ability to disguise identity as micro air vehicle with physical features 115 that imitate power distribution insulators, building apparatus, and by repositioning rotor arms 103 and rotors 107

2. Advantages of the preferred embodiment for perching include:

a. Ability to use flexible but rigidly attached perch hangers 112 in conjunction with rotor arm 103 differential motion to provide the ability to aim body in a large cone of influence b. Ability to aim and expel offensive payload contained in fore body 100a c. Ability to aim body 100 within majority of surveillance sensor 114 field of view d. Ability to position body 100 in many configurations to maximize power line scavenging and corona inception for virtual grounding e. Ability to position rotors 107 to intercept prevailing wind for scavenging f. Ability to position solar cells 102 in two axes for maximum power point tracking 3. Advantages of the preferred embodiment for energy scavenging include:

a. The ability to scavenge energy from multiple electric fields and multiple conductors using 109, 112, and 201 to avoid reliance on current, load, and thus magnetic field through any one conductor b. The use of spark gap relaxation circuitry 500 to greatly increase operation frequency and thus lessen transformer size, weight, and cost, while avoiding use of high voltage semiconductors for switching c. The ability to use coronal effects in watts/meter ionic discharge and virtual grounding 501 to provide a charge sink and leverage voltage reduction and current limiting effects found in coronal behavior d. The ability to scavenge solar energy 102 and 502 e. The ability to scavenge wind energy using rotors 107 and motor controllers 108 f. Ability to leverage both long term 504 and short term 505 energy storage technologies to limit perch time required for energy replenishment 4. Advantages of the preferred embodiment for crawling include:

a. Ability tilt rotor arms 103 and teeter propulsion motors 106 for use as drive wheels when crawling b. Ability to use rotor teeter actuators 105 and differential rotor rotation speed controlled by motor controllers 108 for precise steering while crawling c. Ability to use tail skids 109 as stabilizing appendages while crawling 5. Advantages of the preferred embodiment for payload expulsion include:

a. Ability to expel the payload while flying, perched, and crawling b. Ability to monitor the effects of payload deployment after expulsion c. Ability to tilt rotor arms 103 and teeter rotors 107 so that rotors 107 may function as wheels for crawling Although the prior description contains many specifications, it should not be construed as to limit the scope of any embodiment, but is intended as simply an illustration of possible or presently preferred embodiments.

Thus the scope of the embodiment should be determined by the appended claims and their legal equivalents, rather than by the examples given.

What is claimed is:

1. An insect-like micro air vehicle (MAV) and supporting mission apparatus, comprising:

a central, dangling, three part body comprised of upper, middle and lower sections;

left and right rotor tilt actuators positioned on either side of the body, capable of independent or coordinated motion;

left and right rotor arms extending from and capable of being positioned by the rotor tilt actuators;

left and right rotor teeter actuators attached to the left and right rotor arms, capable of independent or coordinated motion;

left and right propulsion motors, capable of independent or coordinated operation, attached to and capable of being positioned by the left and right teeter actuators;

left and right propulsion motor controllers and regenerators, connected to the left and right propulsion motors, capable of independent or coordinated operation;

left and right rotors having a plurality of fixed or adjustable blades and a circumferential rim, shroud, or other similar circumferential features capable of serving as a wheel contact surface, attached to and driven in the same or opposing directions by the left and right propulsion motors;

left and right elevator actuators, attached to either side of the body, capable of independent or coordinated motion;

left and right elevators, having conformal solar panels and winglets, attached to and capable of being positioned by the left and right elevator actuators;

left and right perch hangers capable of coordinated or independent motion, attached to the body or rotor arms, having the ability to be positioned by the tilt actuators;

left and right perch hanger grapples of a plurality of designs, attached to the perch hangers, individually capable of mechanically and electrically engaging various perches, individually capable of motion relative to the perch hangers;

a plurality of landing tail skids, repositionable whips, antennas, and electromagnetic energy scavenging nodes;

microprocessor based circuitry for implementing control of vectored thrust and body position and reaction, stabilization for flight and perching, and management of surveillance, energy scavenging, and energy replenishment;

control and stabilization sensors and circuitry;

GPS and navigational circuitry and devices;

audio and video sensors, circuitry, transmitters, and surveillance relaying devices;

an expellable, offensive payload;

spark gap or solid state power line and electromagnetic energy scavenging circuitry and devices;

corona based virtual ground circuitry and devices;

solar energy scavenging circuitry and devices;

long term energy storage that is capable of being replenished through energy scavenging capabilities;

integrated strengthening features, including rings and cooling fins, deliberately visible and capable of deception and camouflage in order to mimic a power distribution apparatus;

and a single or plurality of operator possessed and manipulated control transmitters and surveillance receivers, not carried onboard the MAV.

2. The micro air vehicle of claim 1 wherein the long term energy storage is a fuel cell or other hydrocarbon based energy storage device.

3. The micro air vehicle of claim 1 wherein the propulsion motors use or consume a hydrocarbon based fuel.

4. The micro air vehicle of claim 1 wherein energy scavenging capabilities include capture of heat energy employing solid state thermoelectric devices.

5. The micro air vehicle of claim 1 wherein a plurality of smaller, specially shaped solar cells are carried on different areas of the vehicle.

6. The micro air vehicle of claim 1, having control and communication capacity to operate in concert as a member of a plurality (swarm) of micro air vehicles in addition to direct manipulation by an operator.

* * * * *